United States Patent
Ricci

(10) Patent No.: US 9,330,567 B2
(45) Date of Patent: May 3, 2016

(54) ETIQUETTE SUGGESTION

(71) Applicant: AutoConnect Holdings LLC, Wellesley, MA (US)

(72) Inventor: Christopher P. Ricci, Saratoga, CA (US)

(73) Assignee: AutoConnect Holdings LLC, Wellesley, MA (US)

( * ) Notice: Subject to any disclaimer, the term of this patent is extended or adjusted under 35 U.S.C. 154(b) by 81 days.

(21) Appl. No.: 13/678,699

(22) Filed: Nov. 16, 2012

(65) Prior Publication Data

US 2013/0138591 A1 May 30, 2013

Related U.S. Application Data

(60) Provisional application No. 61/560,509, filed on Nov. 16, 2011, provisional application No. 61/637,164, filed on Apr. 23, 2012, provisional application No. 61/646,747, filed on May 14, 2012, provisional (Continued)

(51) Int. Cl.
*G06F 15/18* (2006.01)
*G08G 1/0967* (2006.01)

(Continued)

(52) U.S. Cl.
CPC .......... *G08G 1/096791* (2013.01); *B60K 35/00* (2013.01); *B60K 37/00* (2013.01); *B60K 37/02* (2013.01); *B60K 37/06* (2013.01); *B60R 7/04* (2013.01); *B60R 16/037* (2013.01); *B60W 30/182* (2013.01); *G01C 21/20* (2013.01); *G06F 3/017* (2013.01); *G06F 3/0484* (2013.01); *G06F 3/0488* (2013.01); *G06F 3/04883* (2013.01); *G06F 9/54* (2013.01); *G06F 13/14* (2013.01);

(Continued)

(58) Field of Classification Search
CPC ................... B60R 16/037; B60W 2040/0872; B60W 2050/0095; B60W 2540/22; G08G 1/096725; G08G 1/052; G08G 1/09675; B60K 2350/1028; B60K 2350/1052; B60K 2350/2013; B60K 2350/941; G06N 3/0436; G06N 5/048; G06F 15/18
USPC ..................................................... 706/46, 5
See application file for complete search history.

(56) References Cited

U.S. PATENT DOCUMENTS 5,296,840 A 3/1994 Gieffers
5,521,815 A 5/1996 Rose
(Continued)

FOREIGN PATENT DOCUMENTS

EP 1223567 7/2002

OTHER PUBLICATIONS

'Safe Streets, Livable Streets: A Positive Approach to Urban Roadside Design' Dumbaugh, 2005, Georgia Institute of Technology.*

(Continued)

*Primary Examiner* — Kakali Chaki
*Assistant Examiner* — Peter Coughlan
(74) *Attorney, Agent, or Firm* — Sheridan Ross P.C.

(57) ABSTRACT

Methods and systems for a complete vehicle ecosystem are provided. Specifically, sensor data, accumulated from one or more sensors of one or more vehicles, is compared to rules or standards. Based on the comparison, a system may generate and provide etiquette suggestions to the one or more vehicles to ensure those vehicles do not create a disruption in the flow of traffic. The one or more vehicles can receive the suggestions and provide the suggestions to a user. The user or the vehicle may decide to act on the suggestion.

16 Claims, 11 Drawing Sheets

Related U.S. Application Data application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.

| | | |
|---|---|---|
| *G06F 9/54* | (2006.01) | |
| *B60R 7/04* | (2006.01) | |
| *G08C 19/00* | (2006.01) | |
| *G06N 5/02* | (2006.01) | |
| *H04L 29/08* | (2006.01) | |
| *G08G 1/14* | (2006.01) | |
| *H04W 84/00* | (2009.01) | |
| *H04W 4/00* | (2009.01) | |
| *H04W 4/04* | (2009.01) | |
| *G06Q 40/08* | (2012.01) | |
| *G06F 17/00* | (2006.01) | |
| *G06F 17/30* | (2006.01) | |
| *G06F 3/0484* | (2013.01) | |
| *G08G 1/16* | (2006.01) | |
| *G06F 13/364* | (2006.01) | |
| *H04N 21/482* | (2011.01) | |
| *G06F 21/10* | (2013.01) | |
| *G06Q 30/02* | (2012.01) | |
| *G06F 13/14* | (2006.01) | |
| *B60R 16/037* | (2006.01) | |
| *B60W 30/182* | (2012.01) | |
| *G01C 21/20* | (2006.01) | |
| *B60K 35/00* | (2006.01) | |
| *B60K 37/02* | (2006.01) | |
| *G06F 3/01* | (2006.01) | |
| *G06F 3/0488* | (2013.01) | |
| *G08G 1/017* | (2006.01) | |
| *B60K 37/00* | (2006.01) | |
| *B60K 37/06* | (2006.01) | |
| *G06N 5/04* | (2006.01) | |
| *B60W 40/08* | (2012.01) | |
| *B60W 50/00* | (2006.01) | |

(52) U.S. Cl.
CPC .............. *G06F 13/364* (2013.01); *G06F 17/00* (2013.01); *G06F 17/30386* (2013.01); *G06F 21/10* (2013.01); *G06N 5/02* (2013.01); *G06Q 30/0265* (2013.01); *G06Q 40/08* (2013.01); *G08C 19/00* (2013.01); *G08G 1/017* (2013.01); *G08G 1/143* (2013.01); *G08G 1/16* (2013.01); *H04L 67/02* (2013.01); *H04N 21/482* (2013.01); *H04W 4/001* (2013.01); *H04W 4/046* (2013.01); *H04W 84/005* (2013.01); *B60K 2350/1028* (2013.01); *B60K 2350/1052* (2013.01); *B60K 2350/2013* (2013.01); *B60K 2350/941* (2013.01); *B60W 2040/0872* (2013.01); *B60W 2050/0095* (2013.01); *B60W 2540/22* (2013.01); *B60W 2540/26* (2013.01); *B60W 2540/28* (2013.01); *G06F 2203/04808* (2013.01); *G06N 5/048* (2013.01)

(56) References Cited

U.S. PATENT DOCUMENTS

| | | | |
|---|---|---|---|
| 5,797,134 | A | 8/1998 | McMillan et al. |
| 5,952,941 | A | 9/1999 | Mardirossian |
| 6,112,152 | A | 8/2000 | Tuttle |
| 6,718,239 | B2 | 4/2004 | Rayner |
| 6,765,495 | B1 * | 7/2004 | Dunning et al. .............. 340/903 |
| 7,782,181 | B2 | 8/2010 | Hines et al. |
| 7,821,421 | B2 | 10/2010 | Tamir et al. |
| 7,941,258 | B1 | 5/2011 | Mittelsteadt et al. |
| 7,990,286 | B2 | 8/2011 | Shankwitz et al. |
| 8,344,890 | B2 | 1/2013 | Zhu et al. |
| 8,493,234 | B2 | 7/2013 | McNamara et al. |
| 2002/0095249 | A1 | 7/2002 | Lang |
| 2004/0128062 | A1 * | 7/2004 | Ogino et al. ................. 701/200 |
| 2004/0193347 | A1 | 9/2004 | Harumoto et al. |
| 2004/0209594 | A1 | 10/2004 | Naboulsi |
| 2006/0047386 | A1 | 3/2006 | Kanevsky et al. |
| 2006/0059229 | A1 * | 3/2006 | Bain et al. ..................... 709/205 |
| 2006/0253307 | A1 | 11/2006 | Warren et al. |
| 2007/0001831 | A1 | 1/2007 | Raz et al. |
| 2007/0002032 | A1 | 1/2007 | Powers et al. |
| 2007/0008183 | A1 | 1/2007 | Levi |
| 2007/0088488 | A1 | 4/2007 | Reeves et al. |
| 2007/0257815 | A1 | 11/2007 | Gunderson et al. |
| 2008/0023253 | A1 * | 1/2008 | Prost-Fin et al. ............. 180/400 |
| 2008/0051957 | A1 | 2/2008 | Breed et al. |
| 2008/0129475 | A1 | 6/2008 | Breed et al. |
| 2008/0167757 | A1 | 7/2008 | Kanevsky et al. |
| 2008/0252487 | A1 * | 10/2008 | McClellan et al. ........... 340/936 |
| 2008/0255722 | A1 | 10/2008 | McClellan et al. |
| 2008/0262670 | A1 | 10/2008 | McClellan et al. |
| 2008/0319602 | A1 | 12/2008 | McClellan et al. |
| 2009/0024419 | A1 | 1/2009 | McClellan et al. |
| 2009/0132294 | A1 | 5/2009 | Haines |
| 2009/0210257 | A1 | 8/2009 | Chalfant et al. |
| 2009/0224942 | A1 | 9/2009 | Goudy et al. |
| 2009/0278806 | A1 | 11/2009 | Duarte et al. |
| 2009/0319181 | A1 | 12/2009 | Khosravy et al. |
| 2010/0131300 | A1 | 5/2010 | Collopy et al. |
| 2010/0185341 | A1 | 7/2010 | Wilson et al. |
| 2010/0265104 | A1 | 10/2010 | Zlojutro |
| 2010/0315218 | A1 * | 12/2010 | Cades et al. .................. 340/441 |
| 2011/0021234 | A1 | 1/2011 | Tibbitts et al. |
| 2011/0187520 | A1 * | 8/2011 | Filev et al. .................... 340/438 |
| 2011/0210867 | A1 * | 9/2011 | Benedikt ....................... 340/905 |
| 2011/0234369 | A1 | 9/2011 | Cai et al. |
| 2011/0251734 | A1 * | 10/2011 | Schepp et al. ..................... 701/1 |
| 2011/0267205 | A1 | 11/2011 | McClellan et al. |
| 2012/0038489 | A1 | 2/2012 | Goldshmidt |
| 2012/0158436 | A1 | 6/2012 | Bauer et al. |
| 2012/0197669 | A1 | 8/2012 | Kote et al. |
| 2012/0212353 | A1 | 8/2012 | Fung et al. |
| 2012/0215375 | A1 | 8/2012 | Chang |
| 2013/0085787 | A1 | 4/2013 | Gore et al. |
| 2013/0099940 | A1 | 4/2013 | Protopapas |
| 2013/0134730 | A1 | 5/2013 | Ricci |
| 2013/0135118 | A1 | 5/2013 | Ricci |
| 2013/0138591 | A1 | 5/2013 | Ricci |
| 2013/0138714 | A1 | 5/2013 | Ricci |
| 2013/0141247 | A1 | 6/2013 | Ricci |
| 2013/0141252 | A1 | 6/2013 | Ricci |
| 2013/0143495 | A1 | 6/2013 | Ricci |
| 2013/0143546 | A1 | 6/2013 | Ricci |
| 2013/0143601 | A1 | 6/2013 | Ricci |
| 2013/0144459 | A1 | 6/2013 | Ricci |
| 2013/0144460 | A1 | 6/2013 | Ricci |
| 2013/0144461 | A1 | 6/2013 | Ricci |
| 2013/0144462 | A1 | 6/2013 | Ricci |
| 2013/0144463 | A1 | 6/2013 | Ricci et al. |
| 2013/0144469 | A1 | 6/2013 | Ricci |
| 2013/0144470 | A1 | 6/2013 | Ricci |
| 2013/0144474 | A1 | 6/2013 | Ricci |
| 2013/0144486 | A1 | 6/2013 | Ricci |
| 2013/0144520 | A1 | 6/2013 | Ricci |
| 2013/0144657 | A1 | 6/2013 | Ricci |
| 2013/0145065 | A1 | 6/2013 | Ricci |

(56) References Cited

U.S. PATENT DOCUMENTS

| | | |
|---|---|---|
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0158821 A1 | 6/2013 | Ricci |
| 2013/0166097 A1 | 6/2013 | Ricci |
| 2013/0166098 A1 | 6/2013 | Lavie et al. |
| 2013/0167159 A1 | 6/2013 | Ricci et al. |
| 2013/0226622 A1 | 8/2013 | Adamson et al. |
| 2013/0231800 A1 | 9/2013 | Ricci |
| 2013/0241720 A1 | 9/2013 | Ricci et al. |
| 2013/0245882 A1 | 9/2013 | Ricci |
| 2014/0168436 A1 | 6/2014 | Pedicino |

OTHER PUBLICATIONS

U.S. Appl. No. 13/462,593, filed May 2, 2012, Ricci et al.
U.S. Appl. No. 13/462,596, filed May 2, 2012, Ricci et al.
U.S. Appl. No. 13/840,240, filed Mar. 15, 2013, Ricci.
"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).
Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).
Marturano "General Motors Takes a CUE from Customers," InContext, Nov. 8, 2011, 3 pages, found at: (incontextdesign.com/blog/general-motors-takes-a-cue-from-customers/).
International Search Report and Written Opinion for International (PCT) Patent Application No. PCT/US12/65422, mailed Apr. 30, 2013 13 pages.
Official Action for U.S. Appl. No. 13/679,234, mailed Jul. 12, 2013 10 pages.
Official Action for U.S. Appl. No. 13/843,011, mailed Jul. 9, 2013 9 pages.
Official Action for U.S. Appl. No. 13/678,673, mailed Jul. 3, 2013 19 pages.
"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.
"Audi A8 MMI Touch," Audi of America, Jan. 7, 2011, [retrieved on Apr. 16, 2014], 2 pages. Retrieved from: www.youtube.com/watch?v=O2nZ-WHo9lA.
Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.
Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].
Official Action for U.S. Appl. No. 13/679,234, mailed Dec. 3, 2013 12 pages.
Notice of Allowance for U.S. Appl. No. 13/679,234, mailed Feb. 20, 2014 6 pages.
Official Action for U.S. Appl. No. 13/843,011, mailed Nov. 8, 2013 11 pages.
Official Action for U.S. Appl. No. 13/843,011, mailed Mar. 26, 2014 12 pages.
Official Action for U.S. Appl. No. 13/678,762 mailed Apr. 11, 2014, 8 pages.
U.S. Appl. No. 14/557,427, filed Dec. 1, 2014, Ricci.
U.S. Appl. No. 61/567.962, filed Dec. 7, 2011, Baarman et al.
"Lexus Memory System," Lexus, 2011, 2 pages, retrieved from: http://web.archive.org/web/20110702174622/http://www.lexus.com/models/ES/features/interior/lexus_memory_system.html.
International Preliminary Report on Patentability for International (PCT) Patent Application No. PCT/US12/65422, mailed May 30, 2014 6 pages.
Notice of Allowance for U.S. Appl. No. 13/679,234, mailed Jun. 12, 2014 9 pages.
Final Action for U.S. Appl. No. 13/843,011, mailed Aug. 1, 2014 11 pages.
Final Action for U.S. Appl. No. 13/678,673, mailed Sep. 18, 2014 16 pages.
Official Action for U.S. Appl. No. 13/678,673, mailed Jan. 9, 2015 11 pages.
Official Action for U.S. Appl. No. 13/678,691, mailed Jul. 11, 2014 10 pages.
Final Action for U.S. Appl. No. 13/678,691, mailed Dec. 10, 2014 14 pages.
Final Action for U.S. Appl. No. 13/678,762 mailed Aug. 8, 2014 12 pages.
Official Action for U.S. Appl. No. 13/678,762 mailed Nov. 25, 2014, 9 pages.

* cited by examiner

ETIQUETTE SUGGESTION

CROSS REFERENCE TO RELATED APPLICATIONS

The present application claims the benefits of and priority, under 35 U.S.C. §119(e), to U.S. Provisional Application Ser. Nos. 61/560,509, filed on Nov. 16, 2011, entitled "Complete Vehicle Ecosystem"; 61/637,164, filed on Apr. 23, 2012, entitled "Complete Vehicle Ecosystem"; 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/663,335, filed on Jun. 22, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware"; and 61/715,699, filed Oct. 18, 2012, entitled "Vehicle Middleware." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/840,240, filed Mar. 15, 2013, entitled "Contolller Area Network Bus; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world daily travel is essential to engaging in commerce. Commuting to and from work can account for a large portion of a traveler's day. As a result, vehicle manufacturers have begun to focus on making this commute, and other journeys, more enjoyable, safer, more fair and in a more informed manner.

SUMMARY

Currently, responsible drivers pay inflated insurance premiums because the insurance industry cannot guarantee a particular driver's adherence to law or general driving behavior. It is an unfair responsibility for responsible drivers to pay for others poor behavior, poor driving habits and/or lack of experience An exemplary embodiment is directed towards using various data compiled, detected, or received by a system to analyze factors contributing to an individual's driving behavior and/or habits. In the event that an individual wishes to receive better insurance rates for responsible driving, a lower quantity of driving, or other good driving indicators, the driver may agree to provide insurance tracking information. The insurance tracking system may consider one or more of GPS/location based information (to compare actual speed with speed limit data), G-force sensors (to detect rapid acceleration, hard turns, etc.), perimeter sensors (to detect close-calls with other vehicles and/or stationary objects, inattention while changing lanes) etc., in order to determine conformance with the good-driving terms established by the insurance company.

In accordance with another exemplary aspect, in addition to the system being able to allow better drivers to receive better insurance rates, the system can also be used to dynamically provide feedback to a driver about the quality of their driving, which can be based on an analysis of information from one or more sensors, comparing of a driver's habits to applicable laws and/or regulations, and/or any good-driving terms established by an entity, such as an insurance company. This feedback can be given in real-time, such as via a display installed in or associated with the vehicle (or even a multi-screen device), through the speakers, tactile feedback, such as through the seat, steering wheel, the driver's phone (such as a vibration), or the like, or at a later time, such as from an insurance company representative via a communication such as a call.

In accordance with an exemplary embodiment, some of the information and/or data that can be monitored are perimeter information, G-force information, proximity information, GPS location information, time and date information, biometric information, law and/or regulation information, behavior information from one or more of the driver and passenger(s), mileage information, as well as vehicle information, such as any information acquirable from, for example, on-board diagnostics (such as OBD-II) as well as lighting information, such as turn signals, headlights, radio information, Bluetooth® information, braking information, turning information, acceleration information, and in general any information related to a vehicle's operation.

In accordance with yet another exemplary embodiment, a feedback device provides in, for example, real-time, information to the driver indicating whether or not they are performing within the good-driving terms established by the insurance company, or whether they are not complying with the good-driving terms. This can allow, for example, drivers to be much more in tune with how they are driving as well as receive instant feedback as to which actions cause them to run afoul of the good-driving terms.

Another exemplary aspect of this invention could be utilized to assist with accident deconstruction to, for example, assist with determining fault if vehicle is involved in an accident.

In accordance with another exemplary aspect, a vehicle is equipped with a sensor, such as a camera. The camera helps to detect whether a driver is dozing off or falling asleep, watching the road, texting or talking on the phone, or in general performing any activity that is a distraction while driving. The camera could also work in conjunction with, for example, a seat sensor to assist with detecting whether or not an occupant and/or pet is present in one of the vehicle seats. As with the other information that is being monitored, this information can also be monitored and used for subsequent analysis to determine whether a driver is driving properly and/or whether a driver should be provided feedback regarding their driving habits.

In accordance with another exemplary embodiment, a feedback module can be located in one or more of the vehicle and remotely, such as at an insurance company premise, the feedback module, cooperating with a communication module, is able to not only transfer data collected from the various sensors, and/or a simple analysis decision from the vehicle to the insurance company, but also allows feedback, such as instructions, incentive, or disincentive information, to be relayed to the driver of the vehicle with the cooperation of a communication module and, as discussed, one or more of a display, speakers and tactile feedback device(s).

Another exemplary aspect is directed towards utilizing one or more portions of the information collected for assistance when a vehicle is stolen. Here, if the available data can be forwarded to one or more of an insurance company and/or the police to assist with one or more of vehicle recovery, vehicle location, circumstances and data about when and where the vehicle was stolen, whether or not the doors were locked, and in general any information relating to the status of the vehicle upon being stolen or after being stolen.

In accordance with another exemplary embodiment, location information, such as that collected from a GPS module, is reconciled with local law and regulation information that can also be used as a basis for providing feedback to a driver regarding compliance with laws/regulations at their current position.

Another exemplary aspect, as briefly mentioned above, is directed toward monitoring the behavior of one or more passengers and/or pets in a vehicle, that can be used as a further consideration as to whether the driver is ensuring the safe transportation of passenger(s)/cargo in their vehicle. For example, seatbelt detectors can be used with a seat detection system, such that if a passenger is present, a determination can be made whether or not that passenger is wearing their seatbelt, as well as other information such as information from a camera or biometric sensor(s) used to determine whether, for example, children are playing all over in the vehicle without being appropriately buckled into a child safety seat or seatbelt.

In accordance with another exemplary aspect, those who currently break traffic laws are caught by combinations of video surveillance, radar/laser detection, and/or police officers who are actively monitoring traffic offenses. Accordingly, an exemplary aspect is directed toward a system where a police officer and/or rule trap sensor can ping or otherwise query an automobile for information relating to its speed, driving conditions, and in general any information stored on the vehicle. By comparing this received data from the vehicle to known data relating to stop signs, speed limits, local laws and regulations, and the like, a decision can be made as to whether a law has been broken. For example, a rule trap sensor located along a roadside, need not necessarily determine the speed of a vehicle with a laser, but rather the rule trap sensor can query the vehicle to respond to the rule trap sensor with the vehicle's speed. Therefore, the speed detection is achieved through the vehicle responding to the sensor's question and the vehicle's answer. It should be appreciated that items other than speed could also be requested by the rule trap sensor from the vehicle—in general, the rule trap sensor could query the vehicle and determine whether any infraction had occurred, such as lack of appropriate seat belt usage, expired registration, etc, or simply collect data therefrom usable for any purpose.

This can similarly be used by police officers either independently or in conjunction with existing technologies, such as radar guns, LIDAR, photo red light detectors, and the like. The roadside sensors/rule traps could then be used in a similar manner to photo red light detectors, with the ability to communicate with one or more appropriate entities to issue a warning or a ticket in the instance of a law or a regulation violation.

In accordance with another exemplary aspect, the queryable information can be used to assist with accident reconstruction as any of the stored information discussed herein can be queryable and provided to an entity, such as a police officer investigating an accident. This could be especially helpful where there is conflicting information regarding what actually happened at the scene of an accident.

In accordance with another exemplary aspect, a driving reputation system is provided. As the vehicle collects information from associated sensors and devices as discussed, the data may be stored and related to a specific driver. This related data may be used to develop a corresponding driving reputation. For instance, a vehicle operator may obtain a lower reputation if that vehicle operator is known to drive erratically, make sudden stops, avoid using signals, and/or constantly speeding through school zones, and the like.

It is anticipated that reputation data may be compiled by the vehicle and/or associated systems. Alternatively, or in addition, vehicle operators may report on at least one other driver's behavior by sending a signal to a central repository. This central repository may analyze the reported data and cause the at least one driver's behavior to be reflected in a reputation (grade). In some exemplary embodiments, vehicle operators may report good, bad, and/or other types of behavior. For example, if a driver yields to another driver, wave's thank you, and/or provides another driver space to enter a lane, the other driver may report good behavior about that kind driver.

In accordance with one exemplary aspect, this reputation information can be shared amongst one or more vehicles and optionally displayed, for example, on an on-board display. Thus, as, for example a driver commutes to work, reputation information about those drivers around the driver could be provided one or more of audibly and/or graphically to the driver on their daily commute. This information could then be utilized, for example, by the driver, to help them avoid drivers with bad reputations and/or change their style of driving based on the reputation of one or more drivers around them.

In accordance with another exemplary aspect, a driver could "tag" or otherwise identify another driver that is performing well, or badly. This information could be accumulated and optionally assimilated with other reputation information to generate a total combined score for reputation based not only on an individual driver's performance, but also based on what other drivers think of that particular driver.

In accordance with another exemplary aspect, the system is capable of analyzing all available information related to driving and vehicle operation etiquette and is capable of making suggestions to the driver and/or passengers based on the outcome of the data analysis. For example, if the vehicle is blocking faster traffic in the fast lane, the system may suggest moving over to a slower lane. Similarly, if the user is known to not use turn signals on a regular basis, the system may remind the user during, after, or anticipating a turn, to use the signal. For example, to assist with anticipation of a turn, the system can cooperate with, for example, a GPS navigation tool, and know when a vehicle is about to make a turn in a particular direction based on a mapped destination.

Additionally, the system may also be used to detect a fast approaching vehicle and suggest changing lanes, increasing speed, or the like, to avoid a collision or otherwise impeding another driver(s).

Another exemplary aspect is the capability of being able to send etiquette suggestions to other drivers. This cannot only be limited to etiquette, but could also be information such as you have a tire going flat, your brake light is out, or the like. As will be appreciated, and for privacy reasons, certain filters may be implemented that limit or otherwise restrict the amount of information that is communicatible to one or other drivers with the understanding that other drivers may turn off this feature so they are not able to receive suggestions from their fellow road mates. For example, a vehicle can be provided with an on-dash display that shows the other vehicles around them. These other vehicles can be detected in accordance with one or more of the perimeter or proximity sensors as discussed herein, and a representation of that vehicle placed on the display. Upon the user selecting that vehicle, a communication link could be established with that vehicle thereby allowing the exchange of etiquette or safety type information as discussed. Moreover, other types of information could similarly be shared, such as a driver looking for a recommendation on where to find cheap gasoline or a bagel, and other drivers being able to respond to that query using the same communication link.

In accordance with another exemplary embodiment, monitored information can be utilized by, for example a parent or guardian, to assist with determining driving habits of a child. This information could be used to, for example, provide constructive feedback to improve driving habits and/or monitor a new driver to determine if they are driving in an inappropriate manner.

In accordance with another exemplary aspect, this data can be monitored remotely, via an app or on a PC, or the like, in real-time or near real-time, by a parent or other entity to keep track of a new driver's behavior. As with the other embodiments discussed herein, any of the information that is monitored by the vehicle can be forwarded to this remote location for monitoring with this remote location optionally being able to provide feedback to the vehicle and the driver.

For example, the remote monitor can be provided with information relating to a current vehicle's speed, GPS information, and local law/regulation information such that the remote monitor can determine whether or not the vehicle is compliant with all applicable laws and regulations. The remote monitor could also be populated with various notifications indicating if and when the vehicle has broken a particular law or regulation, the time and date of that infraction, as well as an ability to provide feedback to the driver about their driving behavior. It should be appreciated, however, that this concept need not be limited to new drivers, but could be extended to any driver, such as commercial drivers, elderly drivers, and, in general, any driver.

For example, an app can be stored on a parent's communication device, and this app used to monitor the behavior of a teen driver. This app could optionally run in the background, until a law or regulation is broken, and then a notification could be provided to the parent, optionally, along with supplemental information, regarding the nature of the infraction. One or more of the monitored pieces of data could also be provided in conjunction with the notification regarding the infraction to allow the parent to determine the full scope of the infraction and the severity thereof. Similarly, plots or other summary-type information could be provided to the parent that shows average driving speed, maximum driving speed, whether or not turn signals were used, whether or not there was erratic driving behavior, or in general any information related to one or more of the vehicle, driver, and occupants' behavior. As will be appreciated, this information could be stored and logged and used at a later date. These notifications could also be sent via one or more of an e-mail, text message, SMS message, or the like, such that a parent could, for example, immediately call a driver when there has been a gross infraction or poor driving behaviors exhibited.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "display" refers to a portion of a screen used to display the output of a computer or computing device to a user.

The term "displayed image" refers to an image produced on the display. A typical displayed image is a window or desktop. The displayed image may occupy all or a portion of the display.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. §112, Paragraph 6. Accordingly, a claim incorporating the term "means" shall cover all structures, materials, or acts set forth herein, and all of the equivalents thereof. Further, the structures, materials or acts and the equivalents thereof shall include all those described in any portion of this document. Any one or more of the embodiments herein can therefore be claimed using means-type language.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
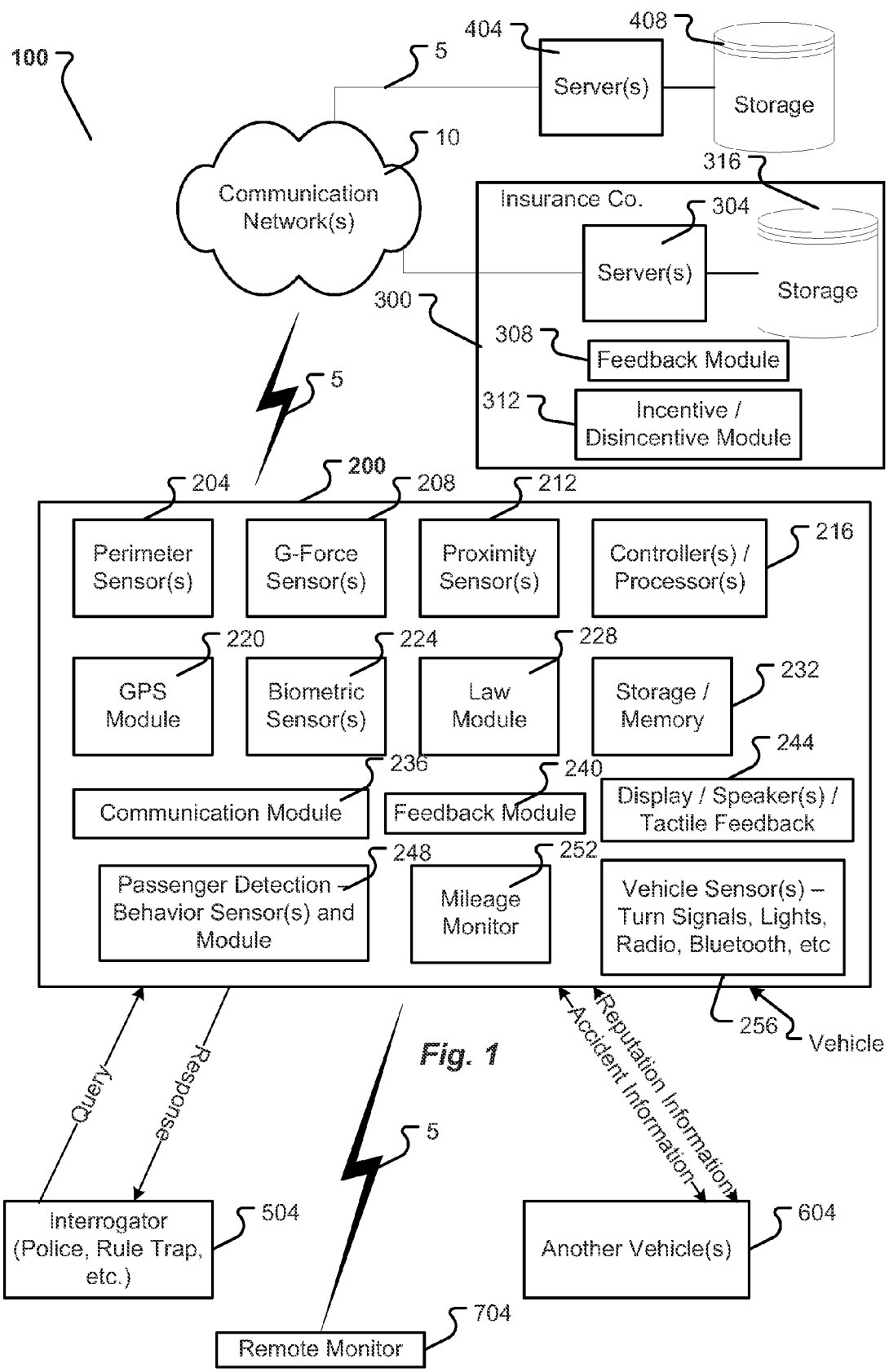
FIG. 1 illustrates an exemplary vehicle monitoring system.

FIG. 1 illustrates an exemplary vehicle monitoring system 100. The vehicle monitoring system 100 includes a vehicle 200, an insurance entity 300, one or more optional servers 404 and storage 408, an interrogator 504, one or more other vehicles 604, and a remote monitor 704, all of which can be interconnected via one or more wired or wireless links 5 and networks 10.

The vehicle 200 comprised one or more perimeter sensors 204, one or more G-force sensors 208, one or more proximity sensors 212; one or more controllers/processors 216; a GPS module 220; one or more biometric sensors 224; a law module 228, storage and/or memory 232, a communication module 236, a feedback module 240, one or more of a display, speaker and tactile feedback system 244, a passenger detection and behavior sensor module 248, a mileage monitor 252 and one or more vehicle sensors that sense one or more of turn signals, lights, radio, Bluetooth® use, braking, turning, accelerating, or in general any function of the vehicle 200.

The insurance company or entity 300 includes one or more servers 304, a feedback module 308, an incentive/disincentive module 312, and storage 316 all interconnected via one or more links. The servers 404 and 408 can be associated with any entity with some of the exemplary entities that are capable of accessing information in the vehicle and/or the insurance company being law enforcement agencies, other insurance entities, other drivers, or the like. As will be appreciated, however, some of the information stored in the various storage locations may be sensitive and therefore access thereto may be limited.

In operation, and in accordance with one exemplary aspect, if driver desires to receive better insurance rates for responsible driving or other good driving behaviors, one exemplary technique determines whether or not a driver should receive a discount or better rates based on the analysis of the driver's behavior. While the exemplary embodiment discussed hereinafter is directed toward vehicle 200, it should be appreciated that these techniques could be driver-centric and based upon a driver driving a specific vehicle, with that driver identifying themself to the vehicle with this identification being storable and forwardable to the insurance company 300 such that the insurance company has granular information about each of the drivers operating vehicle 200.

The vehicle 200 is equipped with one or more perimeter sensors 204 that detect the vehicles proximity to one or more other objects. These perimeter sensors can be one or more of optical, capacitive, infrared, photoelectric, Doppler-based, Eddy-current based, laser based, magnetic, video, infrared, radar based, ultrasonic based technologies, or the like. In general, any sensor that is capable of detecting one or more nearby objects can be used as a perimeter sensor 204 as discussed herein. These perimeter sensors can be located in one or more locations on a vehicle and are capable of sensing the proximity of the vehicle 204 to one or more other objects.

The G-force sensors 208 are able to detect G-forces upon, for example, acceleration, deceleration, or cornering, with this information being recordable in cooperation with the controller 216 and storage 232.

The proximity sensors 212 are capable of detecting the vehicle's 200 proximity to one or more other vehicles 604. The proximity sensors 212 can use similar technology(ies) as the perimeter sensors 204, and can be separate therefrom or combined therewith. The proximity sensors 212 can also optionally optimized for detection of one or more other vehicles near the vehicle 200. For example, the proximity sensors 212 can cooperate with the GPS module 220, and communicate with a central repository (not shown) which tracks a current location of all vehicles. Knowing the current location of all vehicles, the proximity sensor 212, cooperating with the GPS module 220, could determine the vehicles that are in close proximity to the vehicle 200. In a similar manner, using any of the above-described sensor technologies, proximity sensors 212 could detect the presence of one or more other vehicles that are near the vehicle 200 and optionally record detailed information such as distance from the vehicle 200, approach speed, departure speed, or the like. As with the other sensors discussed herein, this information is then storable with the cooperation of the controller 216 in the storage 232.

The GPS (global positioning system) module 220, in addition to recording GPS location information, can also keep track of time and date information and log each trip by start time, end time, driver information, and any aspect of the vehicle's behavior such as highest speed, lowest speed, average speed, journey information, and the like. Again, this information is storable with the cooperation of the controller 216 in the storage 232 as discussed.

The vehicle 200 may also be equipped with one or more biometric sensors 224 that are capable of detecting any biometric information associated with one or more of the driver and passenger(s). These biometric sensors 224 can be located in one or more of the steering wheel, seat, vehicle cabin, other in vehicle control(s), such as in the turn signal switch, cruise control controller and climate control controllers, and are adapted to record any desired biometric characteristic for recording in the storage 232.

The law module 228 is capable of monitoring one or more of local laws and regulations appropriate for the vehicle's 200 location. For example, the law module 228 can cooperate with the GPS module 220 as well as the communication module 236 to receive local laws/regulations from a central repository (not shown) which stores the local laws/regulations for that particular geographic area. These laws and regulations can include such information as speed limit, whether a right turn on red is allowed, whether there are any applicable noise ordinances, whether a vehicle needs to yield to passengers in a crosswalk, and in general can include any laws and/or regulations for that particular geographic area. As will be discussed hereinafter, the information managed by the law module 228 can be used by various other systems such as the feedback module 240 to provide feedback to the driver regarding, for example, whether or not they are in compliance with the local laws/regulations.

Communication module 236, in addition to being able to handle communications between the vehicle 200 and another entity, such as the insurance company 300 or servers 404, can also manage communications between the vehicle and other vehicle 604 as well as the remote monitor 704 and interrogator 504 discussed hereinafter. Moreover, the communication module 236 can include on-board diagnostics (OBD-II) or comparable input(s) from which data can also be aggregated and stored in the storage 232.

The various feedback elements 244 can include one or more of a display, such as a touch-screen display, the multi-screen display as disclosed in the related application(s), one or more speakers, as well as a tactile feedback device(s). More specifically, the display can be, for example, a vehicle installed display, such as an on-board navigation system, or alternatively, and in cooperation with the communication module 236, the vehicle 200 can be paired with an aftermarket display, such as one associated with a GPS device, a Smartphone, a tablet computer, or in general any apparatus that has a display that is capable of communicating with the communication module 236 and therefore the vehicle 200. Similarly, manufacture-installed speakers can be used to provide feedback in addition to one or more of a Smartphone speaker, and in general any speaker that can be paired with or otherwise associated with the vehicle 200 can be used. Tactile feedback devices include, for example, vibrating elements in one or more of the seat, steering wheel, or other vehicle controls, as well as optionally include the ability to provide tactile feedback, such as through the triggering of the vibrator of a Smartphone or cellphone that is paired with the vehicle 200 with the cooperation of the communication module 236.

Passenger detection behavior sensor module 248 allows one or more passenger and driver behaviors to be sensed via, for example, one or more of a camera, passenger presence detector in the seats, or via any other sensor that is capable of determining whether or not a passenger, or a pet, is also present in the vehicle with the driver. The passenger detection and behavior sensor module 248 allows, for example, one or more of the monitoring of the driver watching the road, falling asleep, texting, talking on the phone, being distracted by food or entertainment options, or in general is capable of monitoring any behavior of one or more of the drivers, passengers, pets or cargo in the vehicle.

The mileage monitor 252 can optionally cooperate with the GPS module 220 to track mileage that the vehicle 200 has done. Again, and as with any of the other sensors or modules, information relating to the operation thereto can be stored in storage 232 in cooperation with controller 216 as necessary.

Other vehicle sensors 256 include one or more of sensors associated with turn signals, lights, radio or entertainment system, a Bluetooth® system, the brakes, the steering wheel, the accelerator pedal, and in general, as discussed, can include any sensor that is capable of monitoring the operation of any aspect of the vehicle 200 optionally in conjunction with any information received over one or more busses associated with a vehicle, such as an OBD-II system. Again, any information sensible by one or more of the vehicle sensors 256 is capable of being stored in storage 232.

In accordance with the first exemplary operational embodiment, the GPS module 220, mileage monitor 252, and controller 216 detect that the vehicle has been started and/or is in motion. In conjunction with this detection, a GPS module 220 can record the current vehicle location, time of day, date information, and any other information related to the vehicles trip, in storage 232. Furthermore, controller 216 can enable a data collection mode for any one or more of the sensors and modules discussed herein such that data logging can also commence. As discussed above, and during operation of the vehicle, one or more of perimeter data, G-force data, proximity data, GPS data, biometric data, vehicle data, including, for example, braking data, acceleration data, turn signal data, light data, radio data, entertainment system data, Bluetooth® data, etc., passenger data, and mileage data are collected from the appropriate sensor(s) and stored in the storage 232.

This information can be stored in storage 232 until a later time or forwarded, for example in real-time, with the cooperation of the communication module 236 to the insurance company 300 via one or more links 5 and communication networks 10. This information upon being received by the insurance company 300, is parsed to determine an identification of one or more of the vehicle and/or driver with which this data is associated, and then, in cooperation with server 304, stored in storage 316. As previously discussed, this information can optionally be forwarded to one or more other destinations, such as servers 404 and storage 408, to the interrogator 504, and the like, as discussed hereinafter.

In accordance with an optional exemplary embodiment, the storage 232 can transmit its information to one or more other entities, such as the insurance company 300, at a predetermined time during the day, such as during low network-traffic times in the middle of the night, and/or utilize, for example, a high-speed network communication link associated with the driver's home for uploading the data. For example, upon the vehicle 200 returning to the driver's home, the communication module 236 can detect that the driver's home Wi-Fi is range and commence the appropriate procedures to logon to the Wi-Fi and begin transmission of one or more portions of the data stored in storage 232 to another entity, such as insurance company 300.

In accordance with another exemplary operational embodiment, that could be particularly useful when a vehicle is stolen, one or more of the GPS module 220 and controller 216 determine that vehicle 200 has been parked. The GPS information available from the GPS module 220 is recorded in conjunction with time and date information as well as other optional information such as whether or not the doors are locked, whether or not the alarm is engaged, whether or not the doors and/or windows are closed, whether or not the sunroof is closed or top is up, whether there is cargo in the vehicle, or any other information available from the vehicle sensor 256. This information can optionally be forwarded, with the cooperation of the communication module 236, to one or more of the insurance company 300 or another destination, such as servers 404 and storage 408. If, for example, a theft of the vehicle is reported, the GPS module 220 can be activated and optionally provide, in real-time, that information via communication module 236 to one or more of the insurance company 300, local law enforcement, or the like. Moreover, and in cooperation with the controller 216, the vehicle can provide one or more of the owner and the insurance company 300 notification that the vehicle has been stolen. For example, an exemplary method in which the controller 216 can trigger this activity is the detection of the moving of the vehicle without an appropriate key having started the vehicle. Moreover, in addition to being able to send information in real-time, or at a predetermined later time, the vehicle 200 can optionally execute evasive action with the cooperation of the controller 216 and any one or more of the sensors discussed herein, in cooperation with, for example, the engine control unit, a braking unit, an ignition unit, or the like. In this manner, the vehicle can appropriately be "shut down," slowed down, or otherwise completely or partially disabled to assist with the vehicle recovery. Moreover, the controller 216 can instruct one or more of the sensors and/or modules discussed herein to start recording specific information to, for example, try to capture a picture of the thief in the driver's seat.

In accordance with an optional exemplary embodiment, the controller 216, upon detecting the theft of a vehicle, can automatically commence communications with local law enforcement agencies and relay the various types of information discussed herein to that law enforcement agency to assist with recovery of the vehicle. Again, any information, such as GPS information, a video or camera feed from the on-board camera, or the like, can be sent to the local law enforcement agency to not only assist with recovery of the vehicle, but prosecution of the perpetrator.

In accordance with another exemplary operational embodiment, the system can provide feedback, via one or more of the feedback module 240 and the display/speakers/tactile feedback 244 to the driver. More specifically, this feedback can be provided based on an assessment as to whether or not insurance company 300 wishes to incentivize of disincentivize a particular driver's actions behind the wheel. As discussed, any one or more of the sensors and modules can record data related to the operation of the vehicle and/or driver and/or passenger behavior. This information, being stored in storage 232, is then accessible by one or more of the feedback module 240 associated with the vehicle, or the feedback module 308 associated with the insurance company 300. Based on a set of, for example, rules, a determination is made as to whether there have been one or more triggering events that have occurred that can be correlated to either incentivizing a driver's behavior, or disincentivizing a driver's behavior. For example, either or both of the feedback modules can analyze the data stored in storage 232, or comparable data that has been forwarded with the communication module 236 to storage 316 to determine whether, for example, a threshold has been met.

For example, erratic driving behavior, failure to use appropriate turn signalling or lighting, abrupt braking, or deceleration, constant use of a cellphone, or Bluetooth® services, or the like, can all be activities that an insurance company may want to disincentivize a driver for use thereof.

Alternatively, if the analysis of the data by the feedback module(s) determine that the driver always (or mostly) complies with applicable laws and regulations, always uses their turn signals and drives the vehicle in a safe, consistent, and smooth manner, this could be characterized as activities that an insurance company would want to incentivize a driver for.

Incentivization or disincentivization can work in a number of different exemplary manners. In accordance with the first exemplary embodiment, this information is tracked and analyzed and then used for determining whether or not, for example, a particular driver's policy will be renewed, and/or whether there is going to be an increase or decrease of their annual premiums.

In accordance with another exemplary embodiment, feedback can be provided to the driver, with the cooperation of the feedback module 308 and incentive/disincentive module 312 either in real-time, as discussed below, or for example at some other time. In accordance with one exemplary embodiment, and based on an analysis of the data associated with a particular driver over a certain time period, the feedback module 308 determines that the driver is performing in an excellent manner, and the feedback module 308, cooperating with the incentive/disincentive module 312, could automatically establish a communication, such as via the phone, with the driver at a number stored in storage 316 to congratulate them on their good performance and optionally offer them further incentives or discounts to continue performing in the same or similar manner.

This type of positive feedback could similarly be sent, via the cooperation of the feedback module 308, incentive/disincentive module 312 and communication module 236 to the feedback module 240 located in the vehicle. The feedback module 240 could then determine the appropriate manner to display the incentive information such as via one or more of the display, speaker, and through tactile feedback. This could optionally be done in a manner, such as when the vehicle is stopped, to minimize distraction to the driver.

Analyzing the stored data to determine any appropriate disincentive can work in a similar manner again with the cooperation of the incentive/disincentive module 312, feedback module 308, server 304, storage 316, as well as optionally in cooperation with the communication module 236 and feedback module 240. In accordance with an exemplary embodiment, if analysis of the stored data reveals that the driver is behaving in an erratic manner, such that it is determined via the proximity sensors 212 that the vehicle is coming close to contacting other vehicles, the G-force sensor is recording high G-force inputs, and the accelerator and brake sensors indicate erratic behavior, this system can optionally enter a real-time feedback mode such that the driver can be contacted, for example, ask them whether there is a problem or recommend a change in their driving habits.

In accordance with one exemplary embodiment, one or more of the feedback modules are monitoring the stored data in real-time and are able to provide immediate feedback to a driver to assist them with, for example, avoiding hitting an object or another vehicle. For example, one or more of the data feeds from the perimeter sensors and proximity sensors 212 can be monitored and upon a threshold being detected, the feedback modules cooperating with one or more of the display, speakers, and tactile feedback devices 244 alert the driver that they are getting precariously close to another object or vehicle.

In a similar manger, information from one or more of the biometric sensors 244 can be analyzed and if it is determined based on, for example, because of a slower heart rate and breathing rhythm the driver is dozing off, the feedback module 240 can again "stimulate" the driver via one or more of the display, speaker, tactile feedback devices 244 to assist with waking them up. For example, the driver's seat could be shaken and, in cooperation with controller 216, the temperature in the vehicle turned down since being cold has a tendency to make a driver more alert. As will be appreciated, since there are rich feedback devices available, feedback need not be limited as simply shaking a driver's seat, adjusting the temperature, or playing an alert sound. Rather, the feedback information can be rich and provided on one or more of the display and speaker devices such that detailed information about, for example, the driver's behavior, incentive or disincentive information is communicated.

For example, an analysis of the data could reveal that the driver is performing in a manner that is consistent with all laws and regulations (as confirmed by the law module 228), and is consistently using turn signals and uniformly and safely controlling the vehicle. Feedback indicating this pattern could be provided on the display 244 with the feedback communicating to the driver that they are thanked for their good driving behaviors and that they can except to see a discount on next month's bill.

In a similar manner, based on an analysis of the data, feedback can be provided to the driver such as "you are breaking the speed limit by more than 25 miles an hour. This could have a very negative impact on your insurance renewal rates. Please consider your driving behavior in light of this possibility."

It should further be appreciated that this information need not necessarily be displayed on a display, but, in cooperation with the controller 216, the received information could go through a text-to-speech converter and played on the one or more speakers.

In accordance with a further exemplary embodiment, this information could be forwarded to a destination, such as an e-mail address associated with the driver and stored on record with the insurance company such that the driver can view at a later time.

In accordance with another optional exemplary embodiment, and since the system is able to aggregate data from a multitude of vehicles, one or more portions of the aggregated data can be analyzed to determine, for example, average driver behavior, erratic driver behavior, and good driver behavior, with this analysis being able to be fed back to the system to assist with determining one or more rules that are used in the analysis of received data from a specific vehicle. This could be complemented with machine learning techniques to assist with determining one or more of the rules and thresholds.

As will be appreciated, this data can also be mined for a plurality of other uses such as by one or more of departments of transportation, local law enforcement, traffic planners and analyzers, and in general any entity that has a use in following, analyzing, and/or studying traffic or driver behaviors.

In accordance with another exemplary embodiment, the system monitors behavior to determine whether or not one or more laws or regulations have been broken. As discussed, the GPS module 220, upon determining a vehicle's current location, can download the applicable laws/regulations to the law module 228. The law module 228, cooperating with one or more of the controller 216 and storage 232 analyzes information from any of the various sensors, such as speed information, turn signal information, volume information, and the like. This information is then compared with information in the law module 228 (such as a set of rules) to determine whether or not one or more laws or regulations have been broken.

As will be appreciated, the law module 228 need not necessarily download all the applicable laws/regulations from a central repository via the communication module 236, but in an alternative exemplary embodiment can communicate with this central repository and then make the analysis as to whether one or more laws or regulations have been broken. If a law or regulation has been broken, the system can perform any one or more of the following actions. In accordance with the first exemplary embodiment, notification regarding the violation is sent to one or more entities. In addition to indicating the type of violation, information such as location information, vehicle information, driver information, license plate information, and the like can be forwarded with the type of infraction. As a specific example, if there is a school zone with a speed limit of 15 miles per hour, and the GPS detects that while the vehicle is in the school zone and the school zone is active that the car is driving at a rate of 33 miles per hour, this information could be communicated to an entity, with the cooperation of the communication module 236, controller 216, and storage 232, such as local law enforcement.

As will be appreciated, the information in the law module can also have an indication as to which geographic location those particular laws/regulations are applicable to. Therefore, this information can be reconciled with vehicle location information obtained by the GPS module 220 to determine whether the vehicle is in compliance with those laws and regulations for that specific geographic area.

In addition to, or as an alternative to communicating the infraction to one or more other entities, the feedback module 240, cooperating with the law module 228, GPS module 220, controller 216, and storage 232 can communicate with the display, speaker, or tactile feedback devices 244 and could also provide an indication to the driver if they are not in compliance with one or more laws and/or regulations. This information can optionally be very detailed in nature, for example, "The speed limit in this area is 55, and you are driving 72." Alternatively, or in addition, feedback can be very simple such as a tone plate over the speakers, a "slow down" message shown on the display or a simple vibration of the seat to alert the driver that they are not in compliance with one or more of the applicable laws and regulations.

As discussed above, this information could also be sent to the insurance company 300 recorded in storage 316 and/or optionally be considered by the feedback module 308 and incentive/disincentive module 312 when determining whether or not an incentive or disincentive should be provided to a specific driver.

In accordance with another exemplary embodiment, this stored information can be utilized for interrogation purposes of the vehicle as well. More specifically, an interrogator 504, such as a law enforcement official, a "rule trap" for example installed along the roadside or in a road can be used to catch law or regulation violators. Similarly, an accident investigator, or the like, is able to query the vehicle 202 and retrieve stored information therefrom. This interrogator can be wired or wireless and cooperate with one or more of the communication module 236 and with storage 232.

In accordance with one exemplary embodiment, the interrogator generates a query which is sent to the vehicle 202 requesting specific information. This information can be as broad as "all data" or could be more focused for example "within the last 10 minutes," for a specific geographic area, on a specific road, at a specific traffic light, since the vehicle started, or in general for any time period, at any location or area. This information could then be used by a law enforcement agency to, for example, issue a ticket, corroborate information from one of their sensors, such as radar or LADAR, and/or an addition be used to assist with accident reconstruction. This could be particularly valuable to determine, for example, whether or not a vehicle was speeding or applying the brakes before hitting object.

In accordance with another exemplary embodiment, the "rule trap" utilizes the same techniques to secure information from the vehicle 200 to assist with, for example, one or more of law enforcement, vehicle registration, proof of insurance, or the like. In accordance with this exemplary embodiment, the rule trap 504 could be positioned alongside, for example, a road, with the rule trap 504 interrogating every car or a predefined number of cars, as they pass the rule trap. The rule trap 504 could query the vehicle for specific information, such as what is the vehicle's current speed, as well as identifying information such as VIN information, license plate information and/or driver information. Having this information, the rule trap 504 could make a determination as to whether an infraction has occurred and then coordinate with the appropriate authorities to issue, for example, a speeding ticket.

An exemplary advantage associated with this particular configuration is that it is the vehicle 200 that is providing the data as opposed to some other data acquisition means. Therefore, since GPSs and other related vehicle sensors are typically very accurate, information that can be provided by the vehicle during interrogation tends to be much more accurate than other data acquisition means, such as radar.

An optional aspect includes the ability to determine whether or not the query from the interrogator 504 is authorized. In addition to being able to determine whether the query is authorized, the controller 216 can also limit access to information in the storage 232 based on one or more rules. For example, acceptable queries could be limited to law enforcement agency officers and rule traps and accident investigators, however, queries from another vehicle would be refused. In a similar manner, the controller 216 can filter the types of information available in response to the query based on one or more rules that can be one or more predefined, user defined, or vehicle defined. For example, a rule may specify data is available to a law enforcement officer only if that data is related to a one mile radius of where the vehicle was stopped and interrogated.

As generally discussed above, in addition to data regarding the operation of the driver and/or vehicle 200, a response to the query from the interrogator 504 can also optionally include information such as vehicle registration information and proof of insurance. Therefore, in accordance with one exemplary embodiment the vehicle 200 also stores electronically vehicle registration and proof of insurance information in the storage 232 that can be electronically updated, via the communication module 236, from one or more of the appropriate entities such as the Department of Motor Vehicles and an insurance company.

In accordance with another exemplary embodiment, the passenger detection-behavior sensor module 248 also records a reputation value for a particular driver. Similar to some of the other embodiments disclosed herein, the behavior sensor module 248 can analyze any one or more of the portions of stored data and develop a driver reputation based on that analysis. The reputation can be, for example, excellent driver, good driver, average driver, poor driver, aggressive driver, new driver, elderly driver, or in general any identifier that appropriately describes a driver in vehicle 200. This reputation information can, for example, be forwarded to one or more entities, such as insurance company 300, server 404, and storage 408, to the interrogator 504, to a remote monitor 704, and optionally shared with another vehicle(s) 604.

More specifically, this reputation information can be shared with one or more nearby vehicles that are detected with the cooperation of the proximity sensor 212 and the communication module 236. This could be particularly advantageous for surrounding drivers to appreciate a particular reputation or skill level of surrounding drivers. In accordance with one exemplary embodiment, information regarding the reputation of surrounding drivers can be graphically displayed on the display device 244 and presented to the driver visually such that they, for example, can see a picture of one or more of the vehicles around them and a label identifying the reputation of the driver associated with that vehicle. This information could be particularly advantageous to, for example, allow a driver to avoid another driver who has an aggressive reputation. In a similar manner, it can allow a driver to give a novice driver extra room appreciating that they may be new to the road.

This reputation could also be used as a "quick and dirty" means for the insurance company 300 to determine whether or not a driver is performing poorly in lieu of analyzing one or more of the portions of data stored in storage 232.

It is to be appreciated this reputation information can be updated on a regular or semi-regular basis or, for example, if a triggering event occurs that warrants the changing of the reputation information from one reputation to another.

In accordance with yet another exemplary embodiment, the reputation information could be updated or supplemented with reputation information received from one or more other drivers. In accordance with this exemplary embodiment, reputation information could be a "social status" such that the vehicle 200 is able to receive reputation submissions from one or more other vehicles.

As an example, a first driver sees a second driver that appears to be obeying all laws and appropriately uses signals, and waves after they change lanes, the second driver could provide feedback to them, the feedback indicating that they are a good, courteous driver. This information could then be assimilated into the behavior module 248 and optionally used to update the reputation of that driver. In a similar manner, drivers could accumulate "scores" while other drivers are evaluating them on the road. Thus, a good driver could have hundreds of "thumbs up" while a dangerous and aggressive driver may have thousands of "thumbs down." As with the other data, this information could also be evaluated by one or more of the interrogator 504, insurance company 300, or other entity to assess with determining the particular driver's driving habits.

In accordance with an exemplary embodiment, where a driver desires to associate reputation information with another vehicle, that other vehicle is initially identified. This can be via one or more of the proximity sensor, via Bluetooth®, via license plate data, or through the sensing of an open communications system that can used for the exchange of reputation information. Having identified the vehicle with which reputation information is to be associated, a user than selects an appropriate reputation value which is sent or otherwise associated with the identified vehicle.

In accordance with another exemplary embodiment, instead of this reputation information being forwarded to the other vehicle, the reputation information is stored in storage 232, and at a later time, and in cooperation with the communication module 236, sent to, for example, a central repository that can optionally be queried by one or more entities. The information stored in the central repository could also optionally be pushed to the vehicle that the reputation information was associated with and optionally stored in that vehicle's storage.

In accordance with another exemplary embodiment, etiquette suggestions can be provided by analyzing one or more portions of the stored data and making an "etiquette" suggestion based on the outcome of the data analysis. In addition to the analysis of the data, behavior sensor 248, in cooperation with controller 216, storage 232, and law module 228 can then compare the data with one or more of any applicable laws, rules, regulations, traffic data, local customs, traffic conditions, or the like. If appropriate, the results of this analysis can be used by the behavior sensor module 248 to provide feedback, with the cooperation of the feedback module 240, in the form of an etiquette suggestion to the driver. As an example, if an automobile is blocking faster traffic in the fast lane, the system can suggest that the driver move over to a slower lane. Similarly, if the driver is known to not use turn signals, the system may remind the driver during, after, or anticipating a turn, to use their turn signals. And similarly, the system may also detect a fast approaching vehicle and suggest changing lanes, increasing speed, etc., utilizing one or more of the feedback devices such as on a display, audibly via the speakers or with tactile feedback through one or more of the steering wheel, seat, or the like. As with the other data and determined results discussed herein, this etiquette suggestion can be stored in storage 232, and optionally forwarded to one or more other entities, such as interrogator 504, another vehicle 604, insurance company 300, etc.

As will be appreciated, some drivers may not want to receive etiquette suggestions so a filter can be equipped in the behavior sensor module 248 that allows, for example, a driver to turn on or off the etiquette suggestion or limit the types of suggestions that are provided to the driver. As another example, and for a new driver, the system may be requested to operate with increased sensitivity to provide more etiquette suggestions than normal to try to improve a young or new driver's performance. As will be appreciated, this should be done in a manner that does not distract the new or inexperienced driver with this determination being based on, for example, a driver profile. This driver profile can have such information as age, number of years driving, name, drivers license information, whether or not there are any special restrictions on the license, or the like. Moreover, this driver profile information can include preferences such as temperature or climate control preferences, volume preferences, display preferences, and the like, such that when feedback is provided by one of the feedback devices 244, the preferences in the driver profile govern how that feedback should be provided. For example, for an elderly driver, any audible feedback may be broadcast at a higher volume than normal. Similarly, another driver may not like to have display device 244 flash various messages to them because they find it distractive. Here, the driver could specify that all messages from one of the feedback devices, via another mechanism such as audibly or through tactile feedback.

Similar to the embodiment discussed above regarding reputation information, etiquette information can be provided to one or more other drivers and in a similar manner provided to the other driver(s) either in real-time or at a later time as discussed above. Therefore, the behavior sensor module 248, cooperating with one or more of the proximity sensor 212, controller 216, and storage 232 cooperates with the user to identify a vehicle to associate an etiquette suggestion. Similar to the above embodiment, this association can be done via one or more of license plate entry or identification, an internet protocol address, Bluetooth® address, an interrogation technique, via RFID, via near-field communication, or in general any other technique that allows a first vehicle to positively identify another vehicle. This could also be done in cooperation with, for example, a touch-screen display installed in the vehicle 200 where surrounding vehicles are graphically shown on the display, and the user selects the vehicle by touching on the vehicle to which they want to send the etiquette suggestion. The user than selects the etiquette suggestion, by, for example, speaking into microphone which is then speech-to-text converted into a message, by typing into the touchscreen display, selecting from a canned set of etiquette suggestions, or the like, that is then forwarded, with the cooperation of the communication module 236, to the communication module of the receiving vehicle.

Upon receiving this etiquette suggestion, a determination can be made as to whether the suggestion should be provided to the driver and/or passengers in the vehicle or optionally stored for a later time. In a similar manner to the above-discussed embodiment, the receiving vehicle can be equipped with a filter that governs the handling of received etiquette suggestions and filters based on one or more of suggestion content, driver profile, or the like. In a similar manner, this etiquette suggestion can be sent to a central repository and provided to the driver of the vehicle at a later time, such as via an e-mail, a phone call, downloaded to the vehicle for a display at a later time, or the like. Similarly, this etiquette suggestion can be provided to any entity in the vehicle monitoring system.

Figure 2:
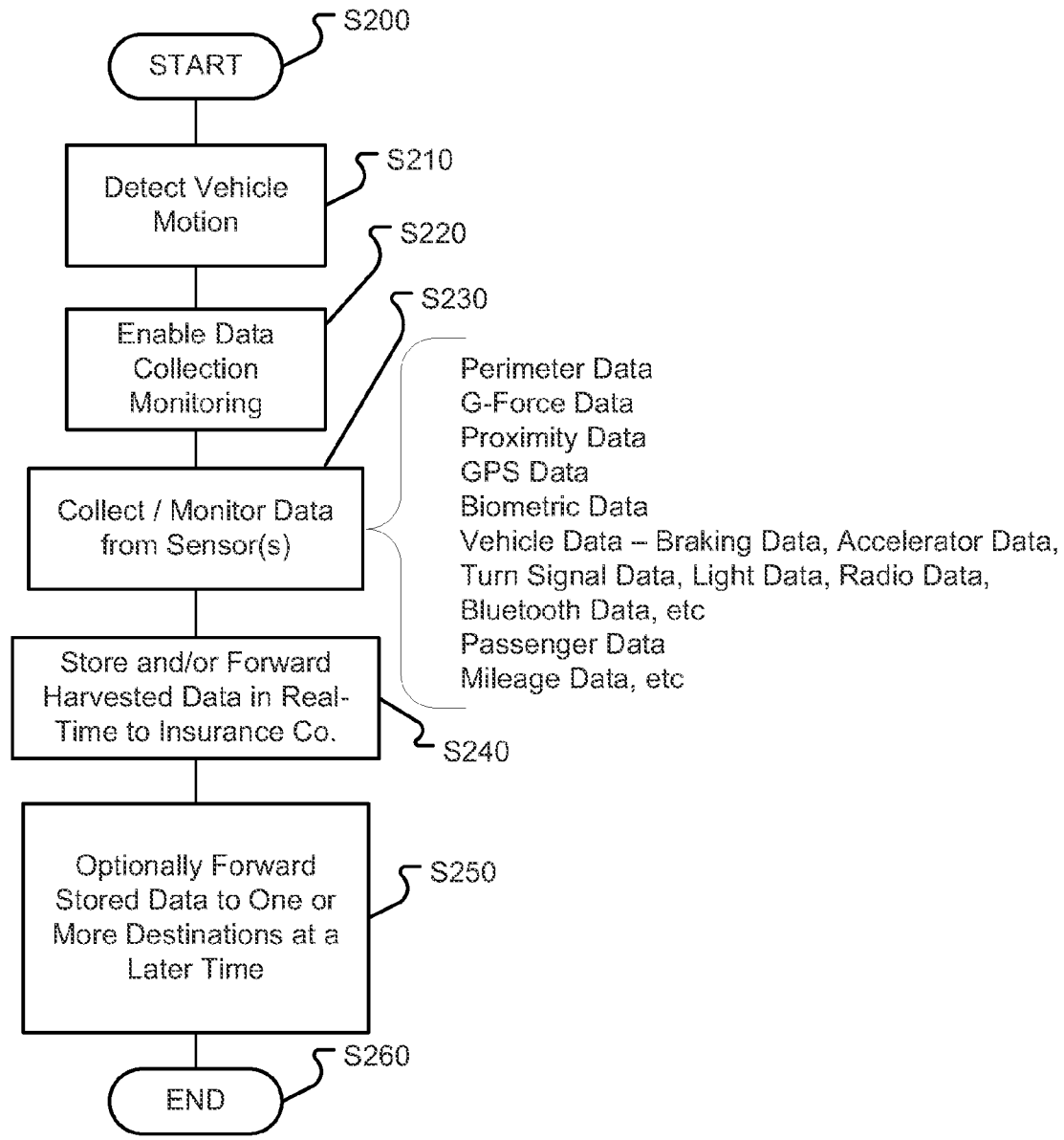
FIG. 2 is a flowchart illustrating an exemplary embodiment of monitoring and storing data.

FIG. 2 illustrates an exemplary technique for monitoring and storing data aggregated by the vehicle monitoring system. In particular, control begins in step S200 and continues to step S210. In step S210, the vehicle being started or set into motion is detected. Next, in step S220 data collection and monitoring is enabled. Then, in step S230, data from one or more of the vehicle's sensors is aggregated and collected. As discussed, this data can be related to one or more of perimeter data, G-force data, proximity data, GPS data, time and date data, biometric data, vehicle data, such as braking data, accelerator data, turn signal data, light data, radio data, Bluetooth® data, and the like, passenger data, mileage data, camera data, and in general can be any of the types of data as discussed herein. Control then continues to step S240.

In step S240, the harvested data is one or more of stored and optionally forwarded in real-time or near real-time to a third party, such as an insurance company. Next, in step S250, the stored data can optionally be forwarded to one or more other destinations such as a home computer, a remote computer, a Smartphone, or in general any location that is capable of receiving the data aggregated by the vehicle. Control then continues to step S260 where the control sequence ends.

Figure 3:
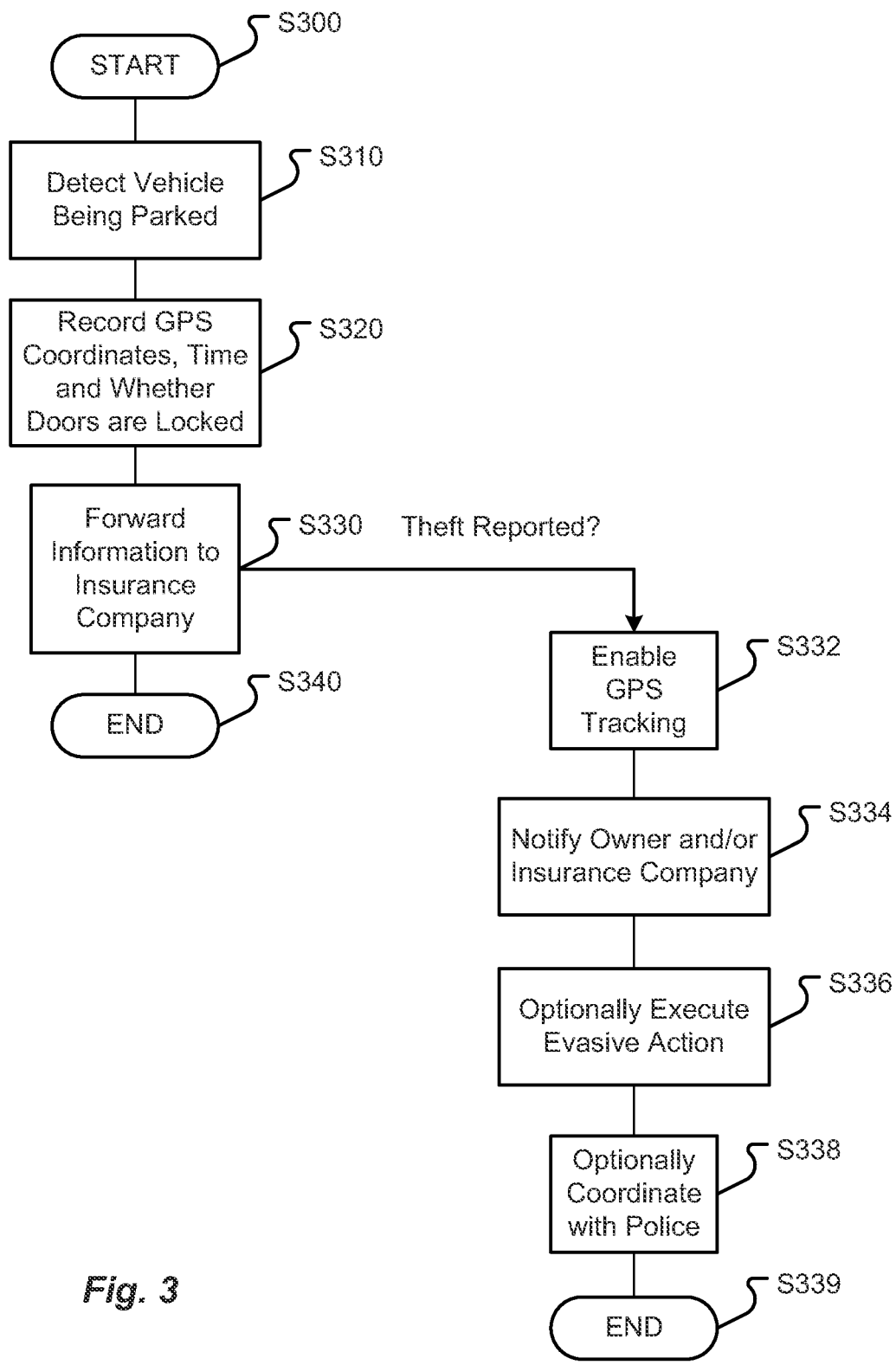
FIG. 3 is a flowchart illustrating an exemplary technique for stolen vehicle tracking.

FIG. 3 illustrates an exemplary technique for assisting with stolen vehicle tracking and/or recovery. In particular, control begins in step S300 and continues to step S310. In step S310 the vehicle is detected as being parked. This can be done, for example, by detecting the removal of the key from the ignition and the vehicle being turned off. Next, in step S320, one or more of GPS coordinate information, time information, and other information related to the status of the vehicle is recorded. This information can include, for example, whether or not the doors are locked, whether or not the windows are up, whether or not the sunroof is open, whether an alarm is set, and in general any characteristic that would either make a vehicle harder or easier to steal being recorded. Control then continues to step S330.

In step S330, the recorded information can optionally be forwarded to an insurance company or other location(s) so that they have the last known good information about the vehicle. If a theft is not reported, control continues to step S340 where the control sequence ends.

If a theft is reported, control jumps to step S332. In step S332, and if possible, GPS tracking can be automatically or remotely enabled. For example, and in accordance with the automatic embodiment, if it is detected that the vehicle is moving without the ignition having received the correct key, GPS tracking can automatically be invoked. This could also be performed remotely such as by an insurance company, local law enforcement, or the like, once they establish communication with the vehicle. Next, in step S334, one or more of the owner and/or insurance company and/or local law enforcement can be notified about the theft. This can be done automatically by the vehicle in conjunction with a communication module where an outbound message is sent to one or more of these entities on any available communications device or media type. Similarly, if the insurance company is monitoring a vehicle that has been identified as stolen, the insurance company could notify the owner and provide them with information as appropriate. Then, in step S336, evasive action can optionally commence execution on the vehicle. As discussed, this can include one or more of shutting the vehicle down, locking the doors, rolling up the windows, disabling some or all of the vehicle systems, automatically applying the brake, allowing remote control of the vehicle, or the like. Control then continues to step S338.

In step S338, any of these activities can further be optionally coordinated with local law enforcement or the police to help ensure a safe and swift recovery of the stolen vehicle. Control then continues to step S339 where the control sequence ends.

Figure 4:
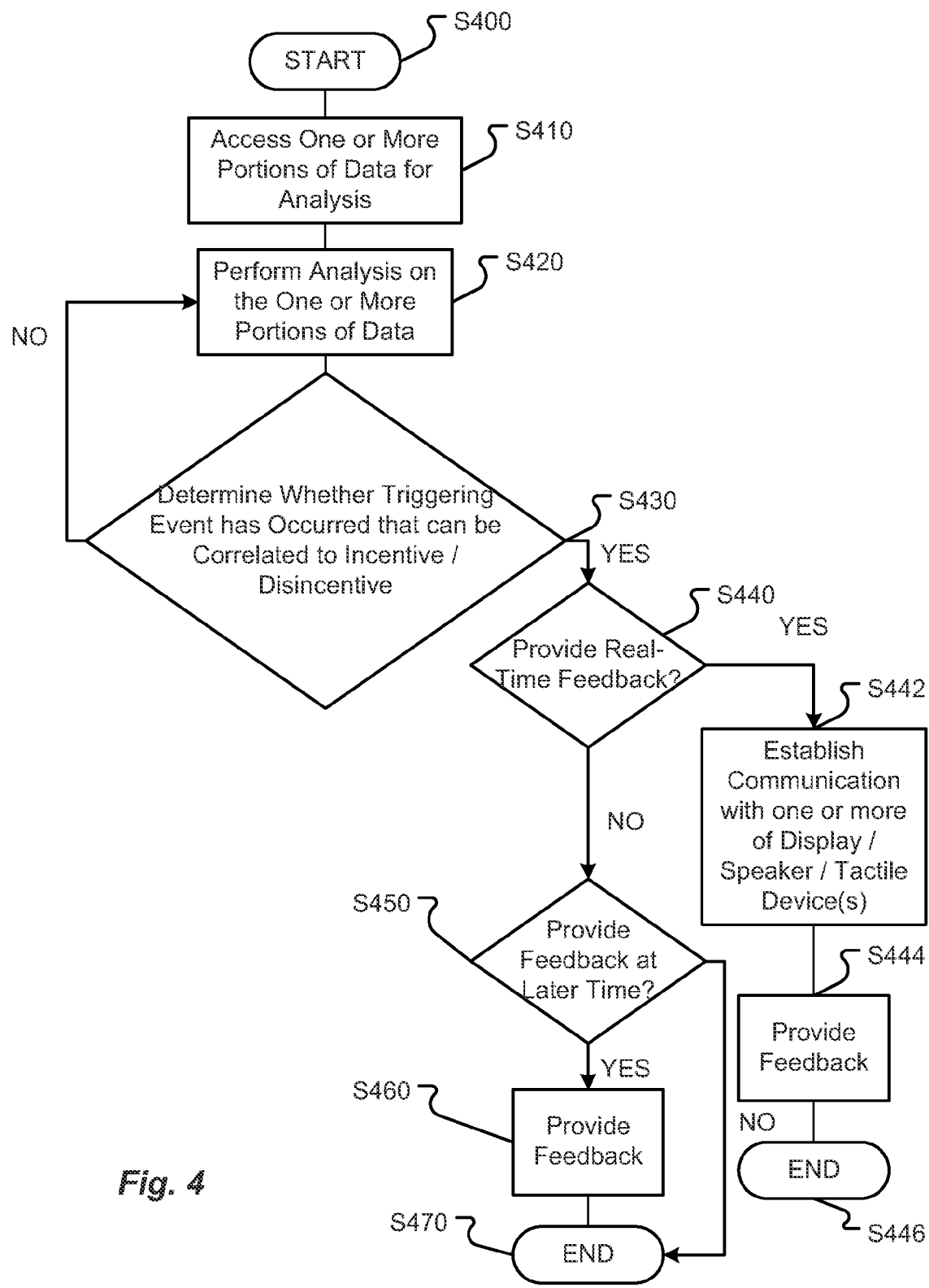
FIG. 4 is a flowchart illustrating an exemplary technique for providing feedback to a driver based on insurance incentives or disincentives.

FIG. 4 illustrates an exemplary technique for providing feedback to, for example, a driver, based on an analysis of one or more portions of data aggregated by the vehicle. In particular, control begins in step S400 and continues to step S410. In step S410, one or more portions of the data are accessed for analysis. Next, in step S420, an analysis is performed on the one or more portions of data. Then, in step S430, a determination is made whether a triggering event has occurred that can be correlated to an incentive or disincentive by an insurance company. For example, this determination can be made relative to one or more rules either stored (after downloading) in the vehicle, or remote location, such as hosted by an insurance company. If it is determined that there has not been a triggering event, control jumps back to step S420. Otherwise, control continues to step S440.

In step S440, a determination is made as to whether real-time feedback should be provided. If real-time feedback is to be provided, control jumps to step S442 with control otherwise continuing to step S450.

In step S450, a determination is made as to whether the feedback should be provided at a later time. If the feedback is to be provided at a later time, control continues to step S460 where the feedback is provided via one or more communications modalities, with control continuing to step S470 where the control sequence ends. If the feedback is not to be provided at a later time, control jumps directly to step S470 where the control sequence ends.

If real-time feedback is to be provided to, for example the driver, in step S442 communication is established with one or more of the display, speakers, tactile devices, driver's Smartphone, or the like. Then, in step S444 this feedback is provided in one or more of audibly, visually, or tactilely, such as via one or more vibrations with control continuing to step S446 where the control sequence ends.

Figure 5:
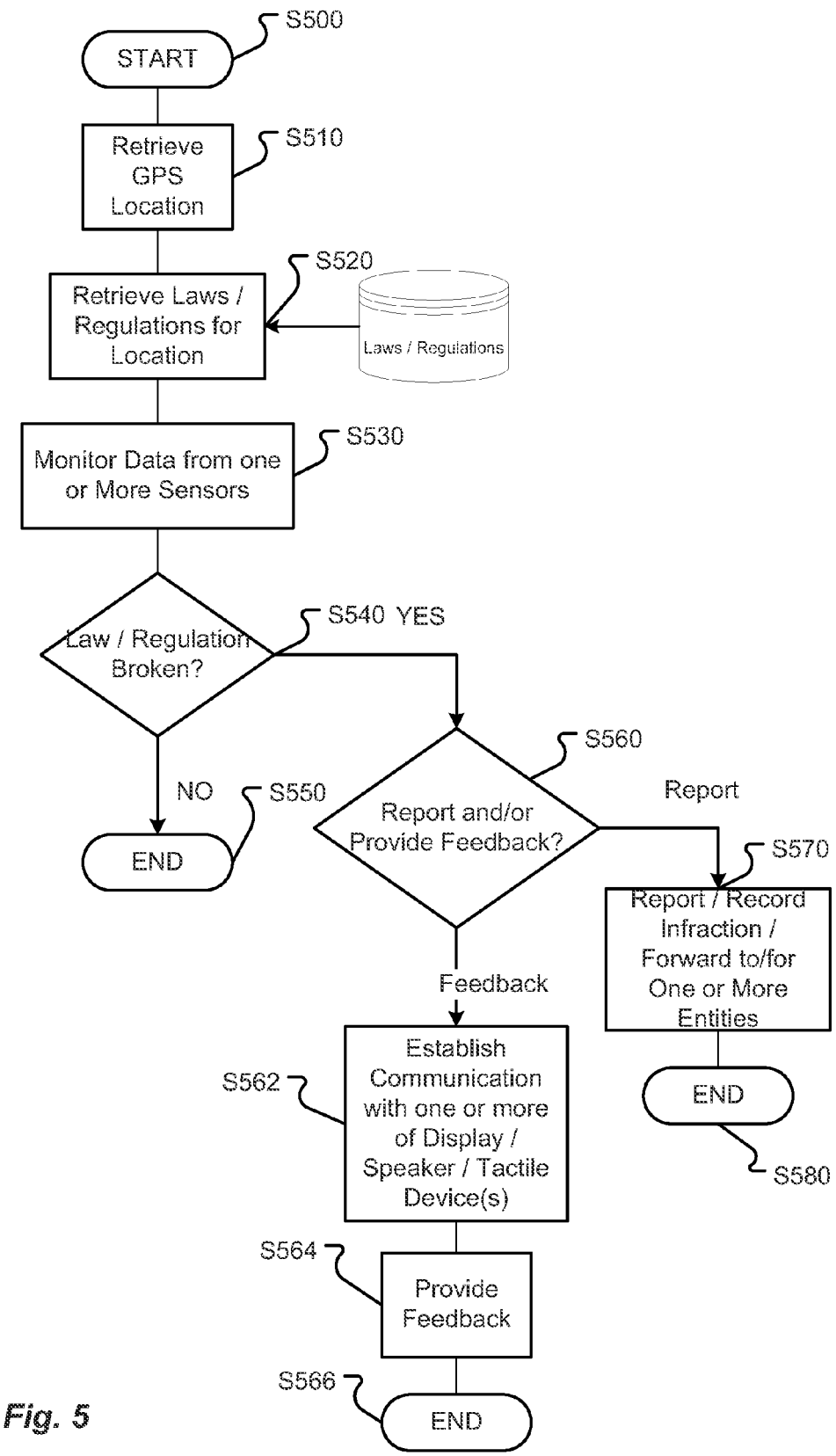
FIG. 5 is a flowchart illustrating an exemplary technique for providing lawbreaking indicators.

FIG. 5 illustrates an exemplary technique for providing an indicator as to whether or not a law or regulation has been broken. In particular, control begins in step S500 and continues to step S510. In step S510, a current GPS location of the vehicle is retrieved. Next, in step S520, the laws and/or regulations for the retrieved GPS location are retrieved from one or more of a local location, such as a storage location in the vehicle, or from one or more remote locations. Knowing the applicable laws and/or regulations for the vehicle's current geographic area, in step S530 data from one or more of the vehicle's sensors is monitored. Then, in step S540, a determination is made as to whether data from one or more of the vehicle's sensors is indicative of a law and/or regulation having been broken. If a law or regulation has not been broken, control jumps to step S550 where the control sequence ends. Otherwise, control continues to step S560.

In step S560, a determination is made as to whether feedback should be provided about the infraction. If feedback is to be provided, in step S562 communication is established with one or more of the display, speaker, tactile devices, user's Smartphone, or the like. Next, in step S564, feedback is provided notifying the driver that there has been an infraction. As discussed, this notification can be one or more of audible, visual, and tactile, such as via one or more vibrations, with control continuing to step S566 where the control sequence ends.

Alternatively, if the infraction is to be reported, control continues to step S570. In step S570, one or more of reporting, recording, or forwarding of a notification of the infraction is sent to one or more entities, such as local law enforcement, insurance companies, or the like. Control then continues to step S580 where the control sequence ends.

Figure 6:
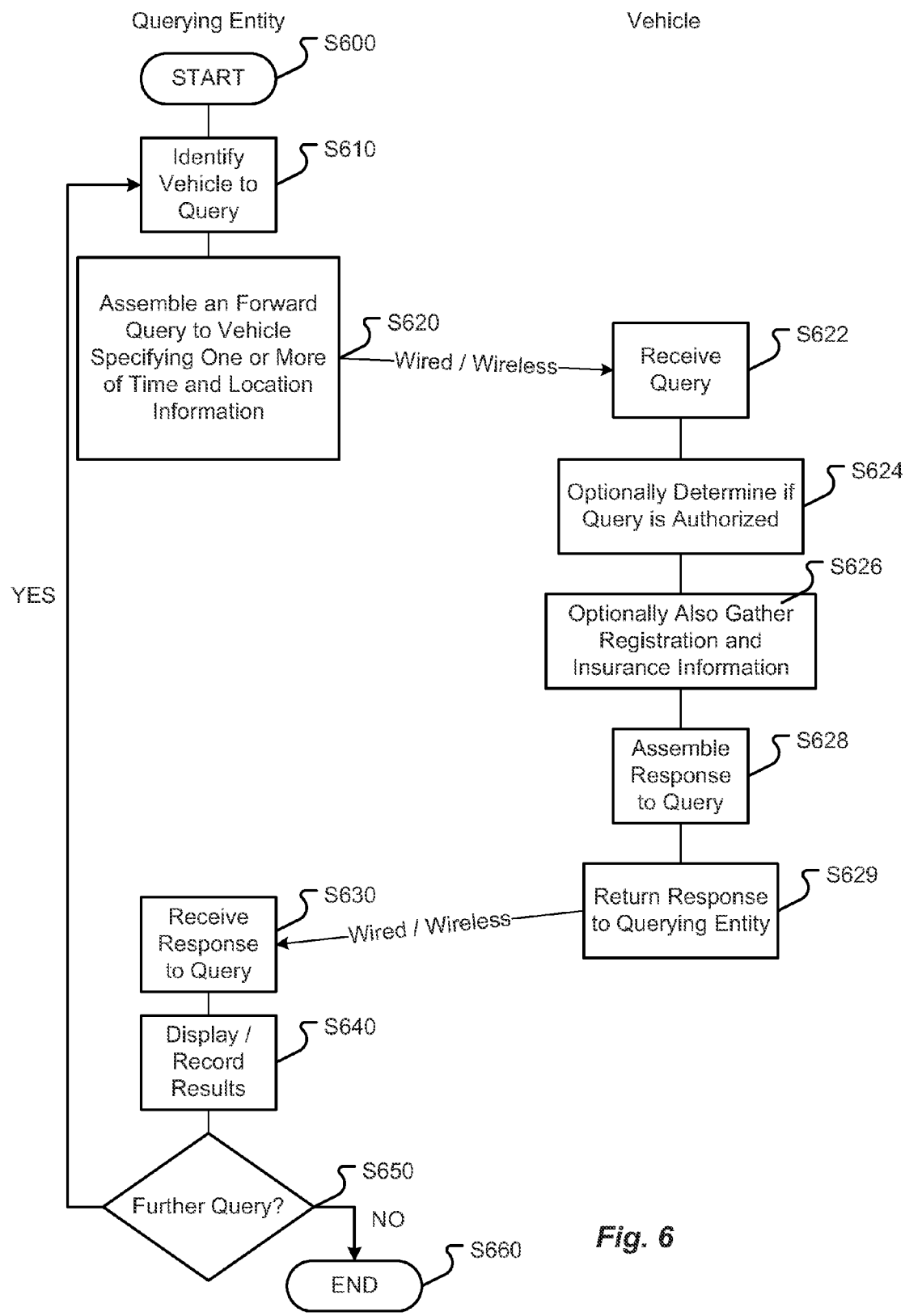
FIG. 6 is a flowchart illustrating an exemplary technique for obtaining information from a vehicle.

FIG. 6 outlines an exemplary technique for querying information from a vehicle. This technique could be particularly useful to, for example, local law enforcement, a rule trap, an accident investigator, or the like. Control begins in step S600, with the querying entity, and continues to step S610. In step S610, a vehicle to be queried is identified. Next, in step S620, a query is assembled and forwarded to the identified vehicles specifying one or more of time and location information. As will be appreciated, this time and location information can be very granular, or it could be very general, such as within the last year, all recorded data, or the like. Then, via either a wired and/or wireless communication protocol, the query is forwarded where it is received by the vehicle in step S622.

Next, in step S624, it is optionally determined whether the query is authorized. For example, a check can be performed using, for example, authenticatable signatures, as to whether or not the query is from an authorized source, such as local law enforcement, a government employee, an accident investigator, or the like. Then, in step S626, and in response to receiving the query, vehicle registration and/or insurance information can also be gathered and bundled with the response to the query. Then, in step S626, the response to the query is assembled by gathering the requested data and/or registration and/or insurance information, with, in step S629, the response to the query being returned to the querying entity.

Then, in step S630, and at the querying entity, the response to the query is received. Control then continues to step S640.

In step S640, the data corresponding to the query can be one or more recorded, displayed, printed, viewed, or the like. Control then continues to step S650 where a determination is made as to whether a further query is appropriate. If a further query is appropriate, control jumps back to step S610 with control otherwise continuing to step S660 where the control sequence ends.

Figure 7:
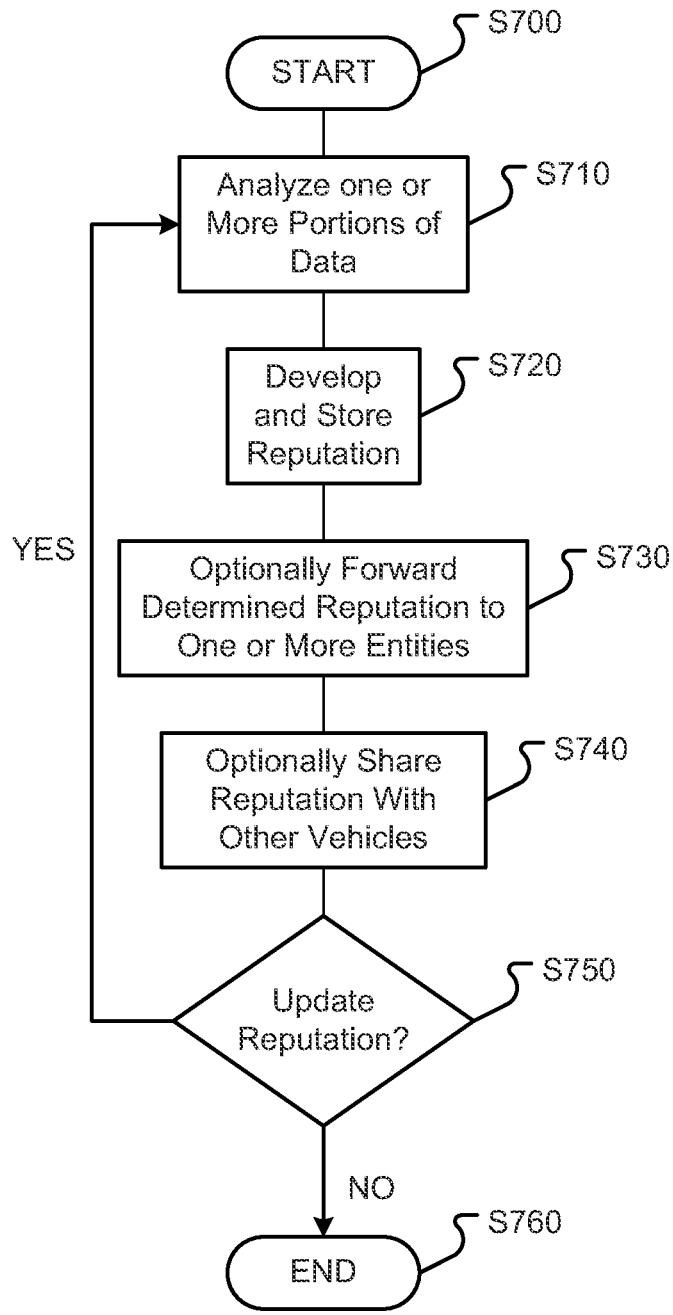
FIG. 7 is a flowchart illustrating an exemplary technique for reputation management.

FIG. 7 outlines an exemplary technique for assembling a reputation. In particular, control begins in step S700 and continues to step S710. In step S710, one or more portions of the vehicle data are analyzed. Next, in step S720, a reputation value is developed and stored based on the analysis of the data. As discussed, this analysis can look to certain metrics, thresholds, and/or average behavior patterns and determine whether a particular vehicle's and/or driver's reputation value or index should be set. Control then continues to step S730.

In step S730, this determined reputation value can then optionally be forwarded to one or more entities, such as an insurance company, law enforcement, or the like. Next, in step S740, this reputation value can also optionally be shared with one or more other vehicles such that other vehicles are privy to the reputation associated with a particular vehicle/driver combination. Control then continues to step S750 where a determination is made whether the reputation value should be updated. If the reputation value should be updated, control jumps back to step S710 with control otherwise continuing to step S760 where the control sequence ends.

Figures 8, 9:
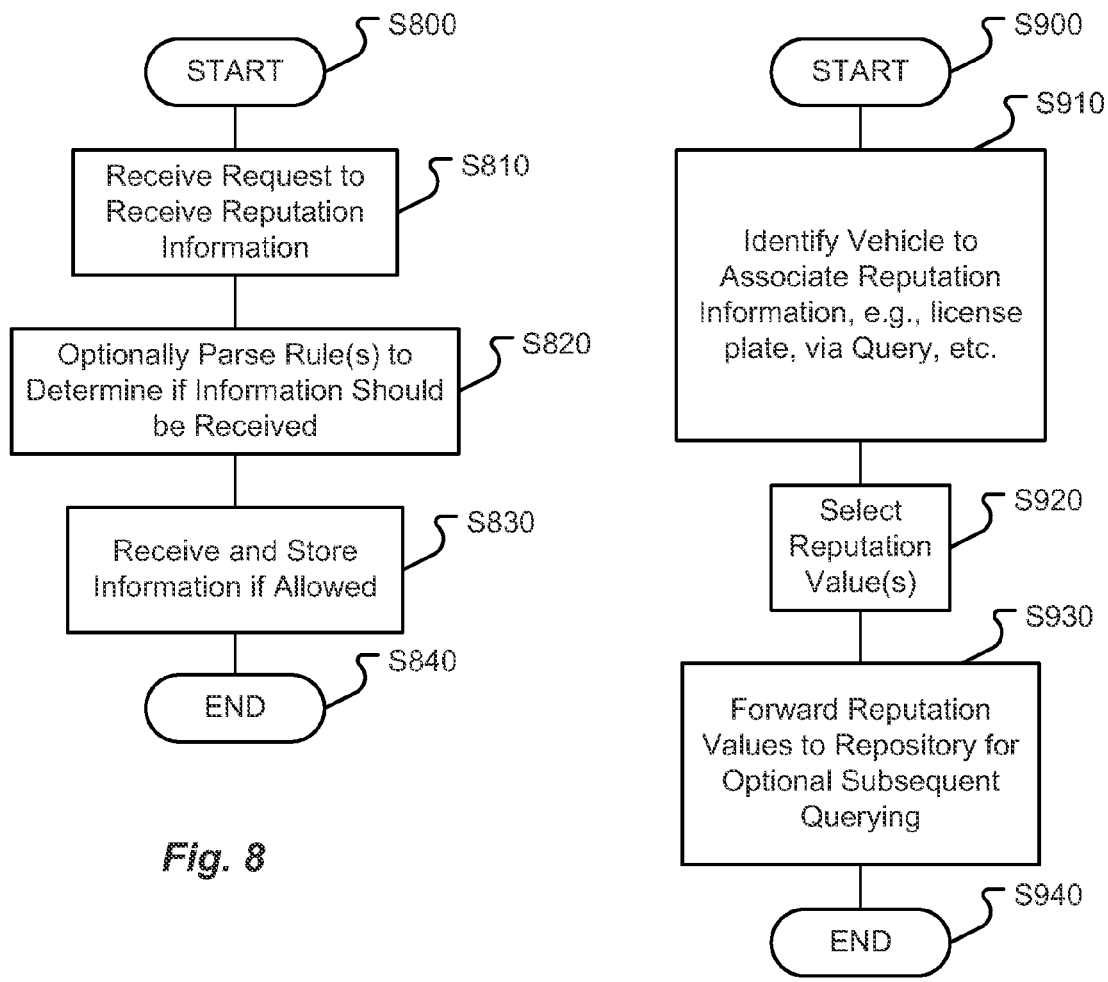
FIG. 8 is a flowchart illustrating an exemplary technique for receiving reputation information.
FIG. 9 is a flowchart illustrating an exemplary technique for associating a reputation.

FIG. 8 illustrates an exemplary technique for receiving reputation information from, for example, one or more other vehicles. Control begins in step S800 and continues to step S810. In step S810, a request to receive reputation information is received. Next, in step S820, and optionally, one or more rules are parsed to determine if the request should be granted. If the request is granted, in step S830 reputation information can be received and stored with control continuing to step S840 where the control sequence ends. If however, for example, the one or more rules indicate that a vehicle is not receiving reputation information, or not receiving certain types of reputation information, the request to receive the reputation information can be denied where the control sequence would end.

FIG. 9 illustrates an exemplary technique for associating reputation information with one or more other vehicles. In particular, control begins in step S900 and continues to step S910. In step S910, a vehicle to associate the reputation information is identified using, for example, one or more of license plate information, via a communications query, graphically by using touchscreen, or the like, as discussed. Next, in step S920, one or more reputation values are selected. This can again be done using one or more predetermined reputation values, or a custom reputation value could be entered. Once the reputation value(s) has been selected, control continues to step S930 where the reputation values are forwarded to a repository(ies) and stored. Once stored, the reputation value(s) can optionally be queried, retrieved and displayed to the identified vehicle driver, or the like. Control then continues to step S940 where the control sequence ends.

Figure 10:
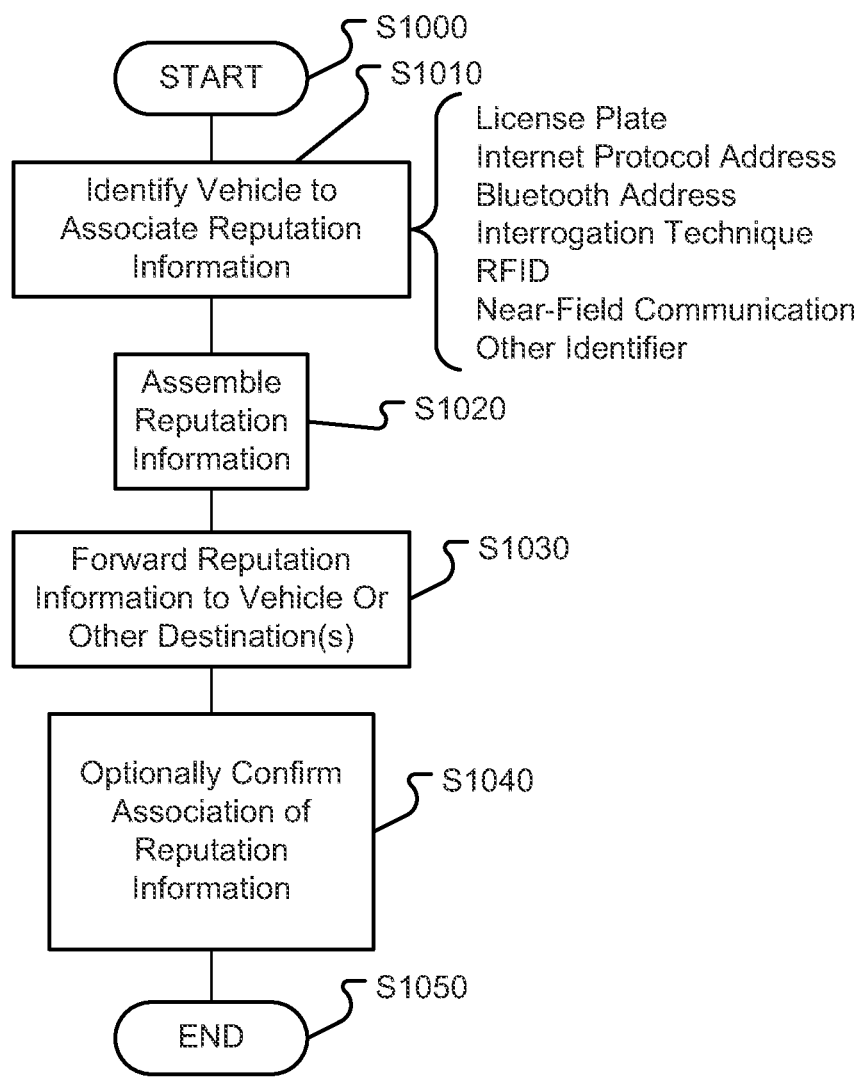
FIG. 10 is a flowchart illustrating an exemplary technique for forwarding reputation information to another vehicle or destination.

FIG. 10 outlines an exemplary technique for associating reputation information with a vehicle. In particular, control begins in step S1000 and continues to steps S1010. In step S1010, a vehicle is identified with which to associate reputation information. This identification can be done via one or more of license plate information, internet protocol address information, Bluetooth® address information, an interrogation technique, using RFID or near-field communications, or in general any other communications protocol or technique that allows another vehicle to be identified. Moreover, and as previously discussed, this can be done by selecting an icon graphically representing the vehicle with which reputation information should be associated, that vehicle having been detected by, for example, a proximity sensor as described. Next, in step S1020 the reputation information is assembled. This reputation information can be selected from, for example, a predefined list, or optionally entered as a custom reputation. Control then continues to step S1030.

In step S1030, the reputation information is forwarded to one or more of the identified vehicle or some other destination. Next, in step S1040, an optional step of confirming that the reputation information was associated with that vehicle can be performed. Control then continues to step S1050 where the control sequence ends.

Figure 11:
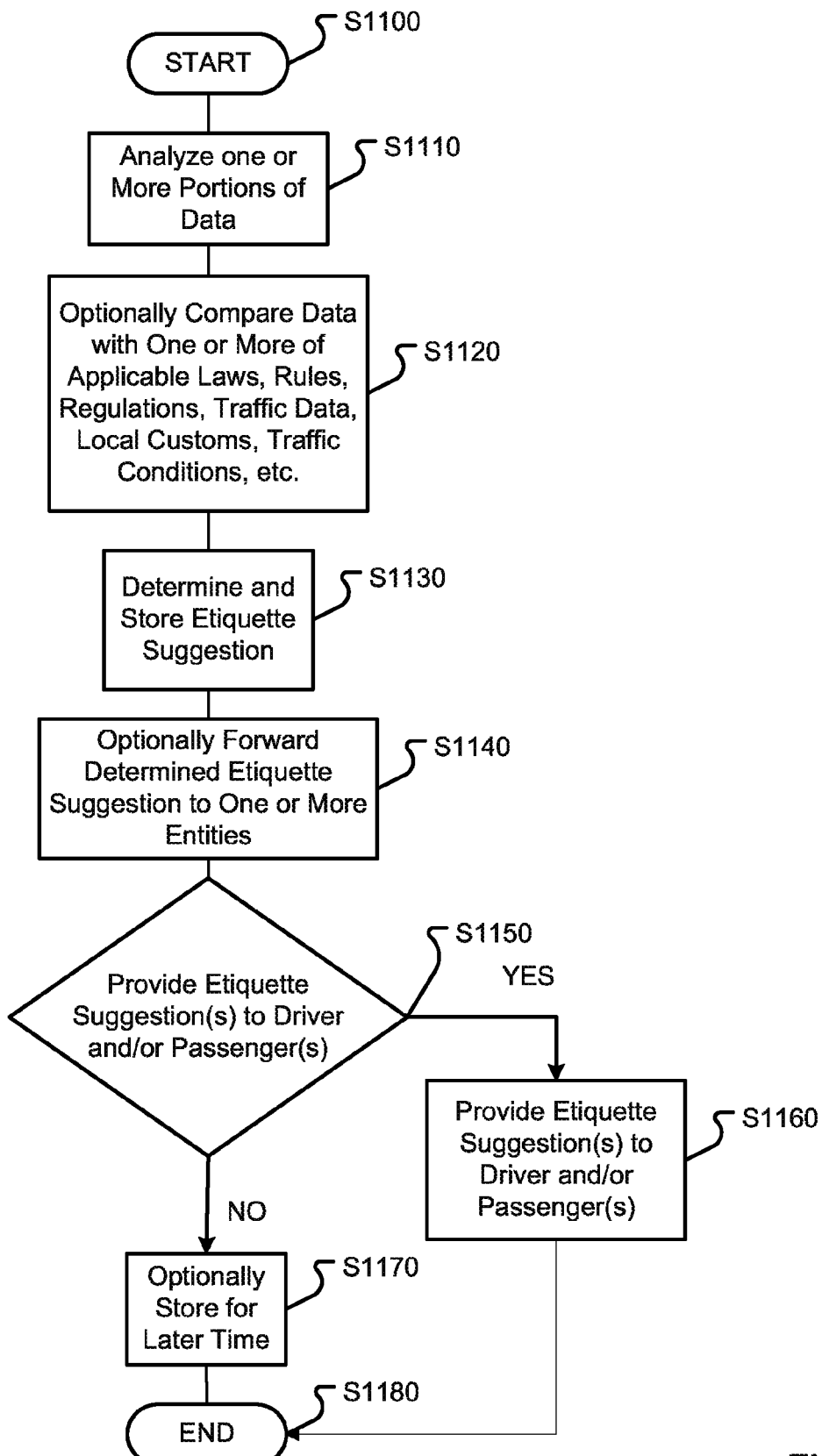
FIG. 11 is a flowchart illustrating exemplary technique for providing etiquette suggestions to drivers and/or passengers.

FIG. 11 outlines an exemplary technique for providing an etiquette suggestion. In particular, control begins in step S1100 and continues to step S1110. In step S1110, one or more portions of data are analyzed. Next, in step S1120, the data is optionally compared with one or more of applicable laws, rules, regulations, traffic data, local customs, traffic conditions, or the like. Then, in step S1130, an etiquette suggestion is determined and stored. Control then continues to step S1140.

In step S1140, this determined etiquette suggestion can optionally be forwarded to one or more entities, aside from the driver. Next, in step S1150, a determination is made as to whether to provide the etiquette suggestion to the driver and/or passenger(s). If the etiquette suggestion is not to be provided, control continues to step S1170 where the etiquette suggestion can optionally be stored with control continuing to step S1180 where the control sequence ends.

If the etiquette suggestion is to be provided to the driver, control jumps to step S1160 where the etiquette suggestion is provided to one or more of the driver and/or passenger via, one or more of the display, speakers, tactile feedback, phone or smartphone, or other audible/visual/tactile feedback device(s). Control then continues to step S1180 where the control sequence ends.

Figure 12:
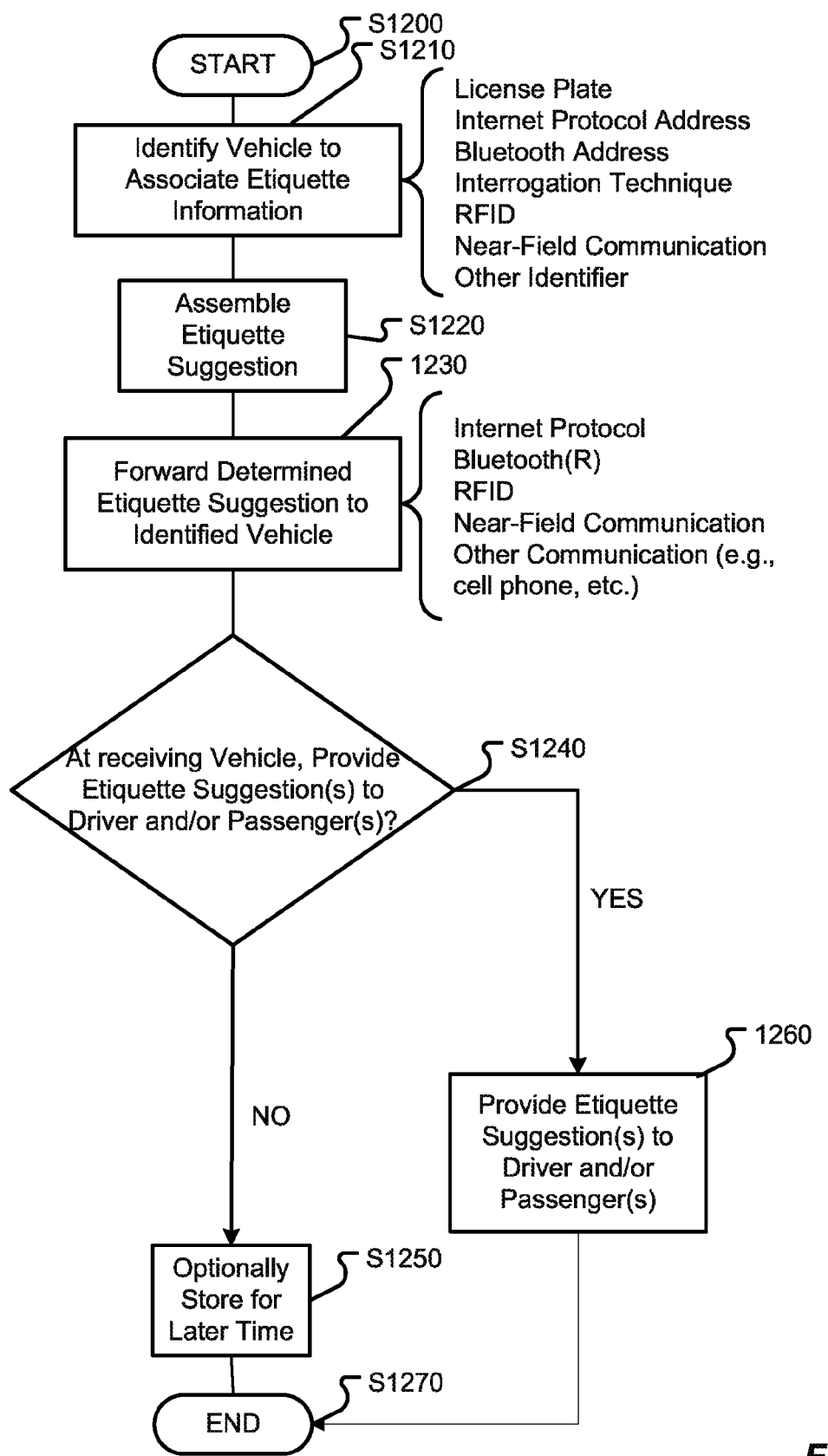
FIG. 12 is a flowchart illustrating exemplary technique to provide suggestions to one or more of drivers and passengers in another vehicle.

FIG. 12 outlines an exemplary technique for forwarding an etiquette suggestion to one or more other identified vehicles. In particular, control begins in step S1200 and continues to step S1210. In step S1210, the vehicle to associate the reputation information is identified. As discussed, this can be done using one or more of license plate information, internet protocol address information, Bluetooth address information, an interrogation technique, RFID, near-field communications, or in general any communications protocol or modality that allows another vehicle to be identified. Moreover, and as discussed, this can be done by selecting via, for example, a touch-screen display, an icon representing the vehicle with which to associate the etiquette information. Next, in step S1220, the etiquette suggestion is assembled. This can be assembled from one or more "canned" etiquette recommendations, or it can be a custom etiquette suggestion entered by a user. Then, in step S1230, the determined etiquette suggestion is forwarded to the identified vehicle. Again, this can be done using one or more protocols and modalities such as an internet protocol, Bluetooth®, RFID, near-field communications, or other communication technique. Control then continues to step S1240.

In step S1240, and at the receiving vehicle, a determination is made as to whether to provide the etiquette suggestion to one or more of the driver and/or passenger(s). If the etiquette suggestion is not to be provided, control jumps to step S1250 with control otherwise continuing to step S1260.

In step S1250, the etiquette suggestion can optionally be stored for retrieval at a later time. Control then continues to step S1270 where the control sequence ends.

If the etiquette suggestion is to be provided, in step S1260 this etiquette suggestion is provided to one or more of the driver and/or passengers via one or more of a display, audibly, and via tactile feedback. Control then continues to step S1270 where the control sequence ends.

The exemplary systems and methods of this disclosure have been described in relation to vehicle sensors, systems and techniques. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links (such as link 5, optionally communicating over network 10) connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, re-ordering, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or one or more means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for managing an etiquette suggestion that can be associated with a vehicle comprising:

storing, by a processor, one or more portions of data harvested from one or more sensors associated with the vehicle;

comparing, by the processor, the stored one or more portions to one or more metrics, rules and/or standards;

determining, by the processor, based on the comparison of the stored one or more portions, a driving habit for a driver of the vehicle, the driving habit including information corresponding to a regular operation of the vehicle by the driver;

determining, by the processor, whether the driving habit for the driver of the vehicle is disrupting a flow of traffic in proximity to the vehicle;

determining, by the processor, in response to determining that the driving habit for the driver of the vehicle is disrupting the flow of traffic in proximity to the vehicle, an etiquette suggestion based on the driving habit for the driver of the vehicle;

storing, by the processor, a value representing the etiquette suggestions;

determining, by the processor, a second etiquette suggestion to be associated with another vehicle;

associating, by the processor, the second etiquette suggestion with the another vehicle; and sending, by the processor, the second etiquette suggestion to the another vehicle to allow the another vehicle to determine if the second etiquette suggestion should be received based on information stored in a second driver profile that is associated with a second driver of the another vehicle.

2. The method of claim 1, further comprising forwarding the stored value to one or more other destinations.

3. The method of claim 1, further comprising sharing the stored value with one or more other proximate vehicles, the etiquette suggestion being displayable on a display associated with one of the one or more other proximate vehicles.

4. The method of claim 1, further comprising providing the etiquette suggestion to the driver of the vehicle based on information stored in a driver profile associated with the driver of the vehicle.

5. The method of claim 1, further comprising forwarding one or more of the etiquette suggestion and the second etiquette suggestion to a repository.

6. The method of claim 5, wherein the repository is queryable by at least one of a law enforcement entity, a rule trap, a governmental entity, and an accident investigator.

7. The method of claim 1, wherein the one or more sensors include one or more of a perimeter sensor, a proximity sensor, a gravitational-force (G-force) sensor, a speed sensor, a mileage monitor, a biometric sensor, a braking sensor, an acceleration sensor, a turn signal sensor, a light sensor, a radio sensor, a Bluetooth sensor, a passenger sensor and a camera.

8. A non-transitory computer readable information storage media having stored thereon instructions, that when executed by one or more processors, cause the steps of claim 1 to be performed.

9. A system adapted to manage an etiquette suggestion that can be associated with a vehicle comprising:

storage adapted to store one or more portions of data harvested from one or more sensors associated with the vehicle;

a processor that compares the stored one or more portions to one or more metrics, rules and/or standards; and a behavior module that programs the processor to determine, based on the comparison of the stored one or more portions, a driving habit for a driver of the vehicle, the driving habit including information corresponding to a regular operation of the vehicle by the driver, determine whether the driving habit for the driver of the vehicle is disrupting a flow of traffic in proximity to the vehicle, determine, in response to determining that the driving habit for the driver of the vehicle is disrupting the flow of traffic in proximity to the vehicle, an etiquette suggestion based on the driving habit for the driver of the vehicle, store a value representing the etiquette suggestion, determine a second etiquette suggestion to be associated with another vehicle, associate the second etiquette suggestion with the another vehicle; and send the second etiquette suggestion to the another vehicle to allow the another vehicle to determine if the second etiquette suggestion should be received based on information stored in a second driver profile that is associated with a second driver of the another vehicle.

10. The system of claim 9, further comprising a communications module adapted to forward the stored value to one or more other destinations.

11. The system of claim 9, wherein the stored value is shared with one or more other proximate vehicles, the etiquette suggestion being displayable on a display associated with one of the one or more other proximate vehicles.

12. The system of claim 9, wherein the behavior module is further configured to provide the etiquette suggestion to the driver of the vehicle based on information stored in a driver profile associated with the driver of the vehicle.

13. The system of claim 9, further comprising a communications module adapted to forward one or more of the etiquette suggestion and the second etiquette suggestion to a repository.

14. The system of claim 13, wherein the repository is queryable.

15. The system of claim 9, wherein the one or more sensors include one or more of a perimeter sensor, a proximity sensor, a gravitational-force (G-force) sensor, a speed sensor, a mileage monitor, a biometric sensor, a braking sensor, an acceleration sensor, a turn signal sensor, a light sensor, a radio sensor, a Bluetooth sensor, a passenger sensor and a camera.

16. The system of claim 9, wherein the etiquette suggestion is also associated with a driver and communicated thereto via one or more of a display, speaker, smartphone and tactile feedback.

* * * * *